(12) United States Patent
Kashiyama et al.

(10) Patent No.: US 8,495,082 B2
(45) Date of Patent: Jul. 23, 2013

(54) STREAM DATA PROCESSING METHOD COOPERABLE WITH REFERENCE EXTERNAL DATA

(75) Inventors: Toshihiko Kashiyama, Hachioji (JP); Itaru Nishizawa, Koganei (JP); Tsuneyuki Imaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 11/502,474

(22) Filed: Aug. 11, 2006

(65) Prior Publication Data

US 2007/0288459 A1 Dec. 13, 2007

(30) Foreign Application Priority Data

Jun. 9, 2006 (JP) ................................. 2006-161233

(51) Int. Cl.
*G06F 17/30* (2006.01)
(52) U.S. Cl.
USPC ........................ 707/769; 709/231; 707/705
(58) Field of Classification Search
USPC ............................... 707/4, 705, 769; 709/231
See application file for complete search history.

(56) References Cited

U.S. PATENT DOCUMENTS

| 5,495,600 | A | 2/1996 | Terry et al. | |
|---|---|---|---|---|
| 2004/0193807 | A1* | 9/2004 | Mogi et al. | 711/137 |
| 2006/0277230 | A1* | 12/2006 | Nishizawa et al. | 707/204 |

OTHER PUBLICATIONS

Article entitled "Adaptive Caching for Continuous Queries", dated Mar. 9, 2005, by Babu et al.*
Article entitled "STREAM: The Stanford Stream Data Manager: User Guide and Design Document" dated Feb. 2005 by Stanford.*
Article entitled "Monitoring Stream Properties for Continuous Query Processing" dated Jun. 2003 by Srivastava et al.*
Article entitled "STREAM: The Stanford Data Stream Management System" dated Mar. 17, 2004 by Arasu et al.*
"Query Processing Resource Management, and Approximation in a Data Stream Management System" by R. Motwani, et al., Stanford University, In a Proc. of the 2003 Conf. on Innovative Data Systems Research (CIDR), Jan. 2003.
"An Overview of SQL" by C. Date, et al., 4 edition, Nov. 1995.
"Rate-Based Query Optimization for Streaming Information Sources" by S. Viglas, et al. , pp. 37-48.
U.S. Appl. No. 11/195,664, filed Aug. 2005, Nishizawa, et al.
U.S. Appl. No. 11/359,540, filed Feb. 2006, Nishizawa, et al.
Yousuki Watanabe et al, "Development of a Data Stream Integration System with a Multiple Query Optimizer", 15th Data Engineering Workshop (DEWS2004) Transactions, [online], Japan, The Institute of Electronics, Information and Communication Engineers (IECE) Data Engineering Study Expert Committee, Jun. 18, 2004, pp. 1-8, http://www/ieice.org/iss/de/DEWS/proc/2004/paper/3-C/3-C-04.pdf.

* cited by examiner

*Primary Examiner* — Mahesh Dwivedi
(74) *Attorney, Agent, or Firm* — Mattingly & Malur, PC

(57) ABSTRACT

Provided is a stream data processing method cooperable with external data in real time. By providing a stream predict cache corresponding to a hierarchical cache of relation data predicted as being a data matching target with stream data, the number of accesses to a database is reduced to improve performance. Data to be stored in the stream predict cache is determined based on a characteristic of the stream data input by a user or monitoring information obtained by monitoring the stream data.

21 Claims, 30 Drawing Sheets

PRODUCT MANAGEMENT TABLE(R1) 226₁

| PRODUCT ID (401) | PRODUCT NAME (402) | PRICE (403) |
|---|---|---|
| 1000 | PRODUCT A | 5000 |
| 1001 | PRODUCT A | 5000 |
| ... | ... | ... |
| 1009 | PRODUCT A | 5000 |
| 1010 | PRODUCT A | 5000 |
| 1011 | PRODUCT A | 5000 |
| ... | ... | ... |
| 1019 | PRODUCT A | 5000 |
| ... | ... | ... |
| 1090 | PRODUCT B | 8000 |
| 1091 | PRODUCT B | 8000 |
| ... | ... | ... |
| 1099 | PRODUCT B | 8000 |
| 1100 | PRODUCT B | 8000 |
| ... | ... | ... |
| 1199 | PRODUCT C | 2000 |
| ... | ... | ... |
| 1500 | PRODUCT D | 10000 |
| 1501 | PRODUCT D | 10000 |
| ... | ... | ... |
| 1510 | PRODUCT D | 10000 |
| 1511 | PRODUCT D | 10000 |
| ... | ... | ... |

*FIG. 5*

ORDER TABLE (R2) 226₂

| ORDER ID | PRODUCT ID | ORDERER NAME |
|---|---|---|
| 10000 | 1000 | ORDERER A |
| 10001 | 1001 | ORDERER B |
| ... | ... | ... |
| 10009 | 1009 | ORDERER C |
| 10100 | 1010 | ORDERER C |
| 10101 | 1011 | ORDERER C |
| ... | ... | ... |
| 10200 | 1019 | ORDERER D |
| ... | ... | ... |
| 10300 | 1090 | ORDERER A |
| 10301 | 1091 | ORDERER A |
| ... | ... | ... |
| 10399 | 1099 | ORDERER D |
| 10400 | 1100 | ORDERER E |
| ... | ... | ... |
| 11000 | 1199 | ORDERER A |
| ... | ... | ... |
| 12000 | 1500 | ORDERER E |
| 12001 | 1501 | ORDERER A |
| ... | ... | ... |
| 12100 | 1510 | ORDERER C |
| 12100 | 1511 | ORDERER D |
| ... | ... | ... |

*FIG. 6*

REGISTERED QUERY  1201

```
register query Q1 as
SELECT ORDER ID,PRODUCT ID,PRODUCT NAME, LINE NAME,
ORDERER NAME FROM S1 [ROWS 50] , R1, R2
 WHERE S1.PRODUCT ID=R1.PRODUCT ID AND R1.PRODUCT ID=R2.
PRODUCT ID AND R2.ORDERER NAME=' ORDERER A ';
```

REGISTERED QUERY MANAGEMENT TABLE 205

| QUERY NAME 601 | REGISTERED QUERY 602 | MEMORY UPPER LIMIT VALUE 603 | QUERY EXECUTION FORMAT STORAGE DESTINATION 604 | REGISTRANT 605 | REGISTRATION DATE/TIME 606 | EXECUTION TARGET STREAM 607 | EXECUTION TARGET RELATION 608/609 |
|---|---|---|---|---|---|---|---|
| Q1 | SELECT ORDER ID, PRODUCT ID, PRODUCT NAME, LINE NAME, ORDERER NAME, FROM S1[ROWS 50], R1, R2 WHERE S1.PRODUCT ID=R1. PRODUCT ID AND R1. PRODUCT ID=R2. PRODUCT ID AND R2. ORDERER = 'ORDERER A'; | 10 MB | 0x7FFFAEE1 | KASHIYAMA | 2006/02/01 13:07:26 JST | S1 | R1, R2 |
| Q2 | SELECT * FROM S2[Range 5 minutes], R3 WHERE S2. ID= R3.ID; | 20 MB | 0x7FFFA471 | KASHIYAMA | 2006/02/02 09:46:13 JST | S2 | R3 |
| ... | ... | ... | ... | ... | ... | ... | ... |

MONITORING INFORMATION MANAGEMENT TABLE 208

TIME STAMP 10:00

| STREAM NAME | COLUMN NAME | DATA RATE | DATA RATE THRESHOLD VALUE | CURRENT VALUE | STATISTICAL VALUE | TIME STAMP | UPDATE FREQUENCY |
|---|---|---|---|---|---|---|---|
| S1 | PRODUCT ID | 10 TUPLES/MINUTE | 5 TUPLES/MINUTE | 1000 | — | 10:00 | 10 MINUTES |
| S2 | TEMPERATURE | 30 TUPLES/MINUTE | — | 24 °C | CENTRAL VALUE = 23 °C | 10:00 | 10 MINUTES |
| S3 | HUMIDITY | 5 TUPLES/MINUTE | 10 TUPLES/MINUTE | 55% | MEAN VALUE = 53 % | 10:00 | 30 MINUTES |
| ... | ... | ... | ... | ... | ... | ... | ... |

*FIG. 11A*

TIME STAMP 10:10

| STREAM NAME | COLUMN NAME | DATA RATE | DATA RATE THRESHOLD VALUE | CURRENT VALUE | STATISTICAL VALUE | TIME STAMP | UPDATE FREQUENCY |
|---|---|---|---|---|---|---|---|
| S1 | PRODUCT ID | 9 TUPLES/MINUTE | 5 TUPLES/MINUTE | 1090 | — | 10:10 | 10 MINUTES |
| S2 | TEMPERATURE | 30 TUPLES/MINUTE | — | 24 °C | CENTRAL VALUE = 23 °C | 10:10 | 10 MINUTES |
| S3 | HUMIDITY | 5 TUPLES/MINUTE | 10 TUPLES/MINUTE | 55% | MEAN VALUE = 53 % | 10:00 | 30 MINUTES |
| ... | ... | ... | ... | ... | ... | ... | ... |

*FIG. 11B*

TIME STAMP 10:20

| STREAM NAME | COLUMN NAME | DATA RATE | DATA RATE THRESHOLD VALUE | CURRENT VALUE | STATISTICAL VALUE | TIME STAMP | UPDATE FREQUENCY |
|---|---|---|---|---|---|---|---|
| S1 | PRODUCT ID | 8 TUPLES/MINUTE | 5 TUPLES/MINUTE | 1180 | — | 10:20 | 10 MINUTES |
| S2 | TEMPERATURE | 35 TUPLES/MINUTE | — | 25 °C | CENTRAL VALUE = 24 °C | 10:20 | 10 MINUTES |
| S3 | HUMIDITY | 5 TUPLES/MINUTE | 10 TUPLES/MINUTE | 55% | MEAN VALUE = 53 % | 10:00 | 30 MINUTES |
| ... | ... | ... | ... | ... | ... | ... | ... |

STREAM CHARACTERISTIC MANAGEMENT TABLE 215

| STREAM NAME 701 | COLUMN NAME 702 | TIME-RELATED CONDITION 703 | VALUE-RELATED CONDITION 704 | PRIORITY OF CONDITION 705 | RESTRICTION JUDGMENT FLAG 706 | FIXED CONDITION FLAG 707 | REGISTRANT 708 709 |
|---|---|---|---|---|---|---|---|
| S1 | PRODUCT ID | - | SEQUENTIAL ATTRIBUTE | MIDDLE | N | N | KASHIYAMA |
| S1 | PRODUCT ID | 10:00<=TIME STAMP<10:20 | 1000<=PRODUCTID<1500 | HIGH | Y | Y | KASHIYAMA |
| S1 | PRODUCT ID | 10:20<=TIME STAMP<11:00 | 1500<=PRODUCTID<2000 | HIGH | Y | Y | KASHIYAMA |
| S2 | TEMPERATURE | JANUARY, 2006 | SENSOR NAME=TEMPERATURE SENSOR WITHIN 1 ±10% CENTRAL VALUE 24 °C | MIDDLE | Y | N | KASHIYAMA |
| S2 | TEMPERATURE | JANUARY, 2006 | SENSOR NAME=TEMPERATURE SENSOR WITHIN 2 ±10% CENTRAL VALUE 15 °C | MIDDLE | Y | N | KASHIYAMA |
| S3 | HUMIDITY | - | NORMAL DISTRIBUTION, AVERAGE 50 % | LOW | N | N | KASHIYAMA |
| ⋮ | ⋮ | ⋮ | ⋮ | ⋮ | ⋮ | ⋮ | ⋮ |

SPC MANAGEMENT TABLE 211
TIME STAMP 10:00

| RELATION NAME | STORAGE LOCATION JUDGMENT CONDITION | STORAGE LOCATION | UPDATE FREQUENCY | UPDATE POLICY | SPC INDEX | ACQUISITION COST | TIME STAMP |
|---|---|---|---|---|---|---|---|
| R1 | 1000<=PRODUCT ID<1100 | MEMORY | LOW | UPON SPC CLEAR INSTRUCTION | NONE | HIGH | 10:00 |
|  | 1100<=PRODUCT ID<1200 | DISK | LOW | UPON SPC CLEAR INSTRUCTION | NONE | HIGH | 10:00 |
| R2 | 1000<=PRODUCT ID<1100 | MEMORY | HIGH | IMMEDIATE UPDATE | ORDER ID | LOW | 10:00 |
|  | 1100<=PRODUCT ID<1200 | DISK | HIGH | IMMEDIATE UPDATE | ORDER ID | LOW | 10:00 |
| R3 | 18<=TEMPERATURE<28 | MEMORY | HIGH | IMMEDIATE UPDATE | TEMPERATURE | LOW | 10:00 |
|  | 13<=TEMPERATURE<18 28<=TEMPERATURE<33 | DISK | HIGH | IMMEDIATE UPDATE | TEMPERATURE | LOW | 10:00 |
| R4 | — | — | — | — | — | — | — |
| ... | ... | ... | ... | ... | ... | ... | ... |

FIG. 16

SPC MANAGEMENT TABLE 211
TIME STAMP 10:10

| RELATION NAME | STORAGE LOCATION JUDGMENT CONDITION | STORAGE LOCATION | UPDATE FREQUENCY | UPDATE POLICY | SPC INDEX | ACQUISITION COST | TIME STAMP |
|---|---|---|---|---|---|---|---|
| R1 | 1090<=PRODUCT ID<1180 | MEMORY | LOW | UPON SPC CLEAR INSTRUCTION | NONE | HIGH | 10:10 |
|  | 1170<=PRODUCT ID<1270 | DISK | LOW | UPON SPC CLEAR INSTRUCTION | NONE | HIGH | 10:10 |
| R2 | 1090<=PRODUCT ID<1180 | MEMORY | HIGH | IMMEDIATE UPDATE | ORDER ID | LOW | 10:10 |
|  | 1170<= PRODUCT ID<1270 | DISK | HIGH | IMMEDIATE UPDATE | ORDER ID | LOW | 10:10 |
| R3 | 18<=TEMPERATURE <28 | MEMORY | HIGH | IMMEDIATE UPDATE | TEMPERATURE | LOW | 10:10 |
|  | 13<=TEMPERATURE <18 20<=TEMPERATURE <25 | DISK | HIGH | IMMEDIATE UPDATE | TEMPERATURE | LOW | 10:10 |
| R4 | ... | ... | ... | ... | ... | ... | ... |

FIG. 17

SPC MANAGEMENT TABLE 211
TIME STAMP 10:20

| RELATION NAME | STORAGE LOCATION JUDGMENT CONDITION | STORAGE LOCATION | UPDATE FREQUENCY | UPDATE POLICY | SPC INDEX | ACQUISITION COST | TIME STAMP |
|---|---|---|---|---|---|---|---|
| R1 | 1500<=PRODUCT ID<1580 | MEMORY | LOW | UPON SPC CLEAR INSTRUCTION | NONE | HIGH | 10:20 |
|  | 1580<=PRODUCT ID<1660 | DISK | LOW | UPON SPC CLEAR INSTRUCTION | NONE | HIGH | 10:20 |
| R2 | 1500<=PRODUCT ID<1580 | MEMORY | HIGH | IMMEDIATE UPDATE | ORDER ID | LOW | 10:20 |
|  | 1580<=PRODUCT ID<1660 | DISK | HIGH | IMMEDIATE UPDATE | ORDER ID | LOW | 10:20 |
| R3 | 19<= TEMPERATURE <29 | MEMORY | HIGH | IMMEDIATE UPDATE | TEMPERATURE | LOW | 10:20 |
|  | 14<= TEMPERATURE <19 29<= TEMPERATURE <34 | DISK | HIGH | IMMEDIATE UPDATE | TEMPERATURE | LOW | 10:20 |
| R4 | - | - | - | - | - | - | - |
| ... | ... | ... | ... | ... | ... | ... | ... |

FIG. 18

SPC ACQUISITION INSTRUCTION (QUERY)
TIME STAMP 10:00  $1301_1$

SELECT ORDER ID, PRODUCT ID, PRODUCT NAME, ORDERER NAME FROM R1, R2 WHERE R1. PRODUCT ID =R2. PRODUCT ID AND R2. ORDERER =' ORDERER A' AND 1000 <= PRODUCT ID< 1200;

*FIG. 21A*

TIME STAMP 10:10  $1301_2$

SELECT ORDER ID, PRODUCT ID, PRODUCT NAME, ORDERER NAME FROM R1, R2 WHERE R1. PRODUCT ID =R2. PRODUCT ID AND R2. ORDERER =' ORDERER A' AND 1200 <= PRODUCT ID< 1250;

*FIG. 21B*

TIME STAMP 10:20  $1301_3$

SELECT ORDER ID, PRODUCT ID, PRODUCT NAME, ORDERER NAME FROM R1, R2 WHERE R1. PRODUCT ID =R2. PRODUCT ID AND R2. ORDERER ='ORDERER A' AND 1500 <= PRODUCT ID< 1700;

*FIG. 21C*

SPC DATA
TIME STAMP 10:00
 SPC_OM DATA 217₁

| ORDER ID | PRODUCT ID | PRODUCT NAME | ORDERER NAME |
|---|---|---|---|
| 10000 | 1000 | PRODUCT A | ORDERER A |
| 10300 | 1090 | PRODUCT B | ORDERER A |
| 10301 | 1091 | PRODUCT B | ORDERER A |

1001, 1002, 1003, 1004, 1005

TIME STAMP 10:00
SPC_OD DATA 219₁

| ORDER ID | PRODUCT ID | PRODUCT NAME | ORDERER NAME |
|---|---|---|---|
| 11000 | 1199 | PRODUCT C | ORDERER A |

TIME STAMP 10:10
SPC_OM DATA 217₂

| ORDER ID | PRODUCT ID | PRODUCT NAME | ORDERER NAME |
|---|---|---|---|
| 11000 | 1199 | PRODUCT C | ORDERER A |

SPC_OD DATA 219₂
 NO DATA

*FIG. 22B*

TIME STAMP 10:20
SPC_OM DATA 217₃

| ORDER ID | PRODUCT ID | PRODUCT NAME | ORDERER NAME |
|---|---|---|---|
| 12001 | 1501 | PRODUCT D | ORDERER A |

SPC_OD DATA 219₃
NO DATA

*FIG. 22C*

LOG 222                                                    1401

10:21 delete stream  tuple (10:21, 2500, LINE A)
condition "10:20<=TIME<=11:00, 1500<= PRODUCT ID<=2000"KASHIYAMA ;
...

FIG. 24

DATA MATCHING RESULT 113

| TIME STAMP | ORDER ID | PRODUCT ID | PRODUCT ID | PRODUCT NAME | ORDERER NAME |
|---|---|---|---|---|---|
| 10:00 | 10000 | 1000 | LINE A | PRODUCT A | ORDERER A |
| 10:10 | 10300 | 1090 | LINE A | PRODUCT B | ORDERER A |
| 10:10 | 10301 | 1091 | LINE B | PRODUCT B | ORDERER A |
| 10:20 | 12001 | 1501 | LINE C | PRODUCT D | ORDERER A |

FIG. 25

REGISTERED QUERY MANAGEMENT TABLE 205

| QUERY NAME 601 | REGISTERED QUERY 602 | QUERY EXECUTION FORMAT STORAGE DESTINATION 604 | REGISTRANT 605 | REGISTRATION DATE/TIME 606 | EXECUTION TARGET STREAM 607 | EXECUTION TARGET RELATION 608 | MEMORY UPPER LIMIT VALUE 603 610 611 |
|---|---|---|---|---|---|---|---|
| Q1 | SELECT ORDER ID, PRODUCT ID, PRODUCT NAME, LINE NAME, ORDERER NAME FROM S1[ROWS 50], R1, R2 WHERE S1.PRODUCT ID=R1. PRODUCT ID AND R1.PRODUCT ID=R2. PRODUCT ID AND R2. ORDERER='ORDERER A' ; | 0x7FFFAEE1 | KASHIYAMA | 2006/02/01 13:07:26 JST | S1 | R1 | 7 MB |
|  |  |  |  |  |  | R2 | 3 MB |
| Q2 | SELECT * FROM S2[Range 5 minutes], R3 WHERE S2. ID=R3.ID; | 0x7FFFA471 |  | 2006/02/02 09:46:13 JST | S2 | R3 | 20MB |
| ... | ... | ... | ... | ... | ... | ... | ... |

FIG. 26

STREAM DATA PROCESSING METHOD COOPERABLE WITH REFERENCE EXTERNAL DATA

CLAIM TO PRIORITY

The present application claims priority from Japanese application P2006-161233 filed on Jun. 9, 2006, the content of which is hereby incorporated by reference into this application.

CROSS-REFERENCE TO RELATED APPLICATION

This application is related to U.S. application Ser. No. 11/195,664, filed on Aug. 3, 2005, the disclosure of which is hereby incorporated by reference.

This application is also related to U.S. application Ser. No. 11/359,540 filed on Feb. 23, 2006, the disclosure of which is hereby incorporated by reference.

BACKGROUND

The present invention relates to a method of configuring a stream data processing system which allows stream data in real time and an external data to cooperate with each other, and a method of allowing the real-time data and the external data to cooperate with each other in the stream data processing system.

In comparison with a database management system (hereinafter, referred to as "DBMS") which executes a processing for data stored in a storage system, there is an increasing demand for a data processing system which performs real-time processing on data arriving from moment to moment. For example, in a stock brokerage system, how to quickly respond to a stock price movement is one of the most important points of the system. As in the case of a conventional DBMS, a method of temporarily storing stock data in a storage system and then retrieving the stored data does not enable quick response to the speed of stock price movement, which may result in missing a business opportunity. For example, U.S. Pat. No. 5,495,600 discloses a mechanism of periodically executing a stored query. However, it was difficult to apply the mechanism to the real-time data processing, for which the query needs to be executed as soon as data such as a stock price arrives.

As the data processing system suitable for the real-time processing of the data arriving from moment to moment as described above, the data being defined as stream data, for example, a stream data processing system STREAM is disclosed in "Query Processing, Resource Management, and Approximation in a Data Stream Management System" (Written by R. Motwani, J. Widom, A. Arasu, B. Babcock, S. Babu, M. Datar, G. Manku, C. Olston, J. Rosenstein, and R. Varma, In Proc. of the 2003 Conf. on Innovative Data Systems Research (CIDR), January 2003).

In the stream data processing system, in contrast to the conventional DBMS, queries are first registered in the system. Simultaneously with the arrival of data, the queries are continuously executed. In order to efficiently process the stream data, the system STREAM has introduced a notion called a sliding window for cutting out a part of the stream data. As a suitable example of a descriptive language of the query containing a designation of the sliding window, a continuous query language (CQL) disclosed in "Query Processing, Resource Management, and Approximation in a Data Stream Management System" (ditto) can be given. The CQL is an extended structured query language (SQL), which is widely used in the DBMS, by using parentheses after a stream name in FROM phrase in the SQL for designating the sliding window. As the SQL, the SQL disclosed in "A Guide to SQL Standard (4th Edition)" (Written by C. J. Date and Hugh Darwen, Addison-Wesley Professional; 4 edition (Nov. 8, 1996), ISBN: 0201964260) is known. As representative methods of designating the sliding window, two methods can be cited. To be specific, (1) a method of designating a number of data strings to be cut out, and (2) a method of designating a time interval of a data string to be cut out. For example, "Rows 50 Preceding" described in a second section of "Query Processing, Resource Management, and Approximation in a Data Stream Management System" (ditto) corresponds to a suitable example of the above-mentioned method (1) of cutting out fifty-rows of data as a target to be processed, whereas "Range 15 Minutes Preceding" corresponds to a suitable example of the above-mentioned method (2) of cutting out fifteen-minute of data as a target to be processed. The stream data obtained by cutting out with the sliding window is retained on a memory to be used for the query processing.

The stream data processing system is expected to be used for the applications requiring the real-time processing, representative examples of which are a financial application, a traffic information system, and computer system management.

SUMMARY OF THE INVENTION

In some cases, there arises a need of converting the stream data to significant information for users who use the stream data arriving from moment to moment. For example, in a manufacturing step of the product, when the stream data is data obtained by reading an RFID tag attached to a product with an RFID reader or data output from a manufacture management server for managing the RFID reader, the stream data contains a code of the product, information of the manufacturing step, and the like. Since the product code is information that is hard to understand for the users, the stream data processing system is required to make a query to a database to obtain significant information, such as a product name, from the product code to provide the users with the significant information. Alternatively, when the stream data is data output from a sensor node or data output from a sensor network server that manages a sensor network, an ID of the sensor node and sensing data are contained as the stream data. Since the ID of the sensor node is information that is hard to understand for the users, the stream data processing system is required to make a query to the database to obtain significant information, such as the location and the type of the sensor node, to provide the users with the significant information.

In the above-mentioned stream data processing system of the conventional technique, the stream data conversion processing (stream data processing) as described above is executed each time the stream data is received, resulting in the following problems.

(1) Since access to the database (hereinafter, referred to as "external data") requires a long processing time, the time required for access to the external data becomes a bottleneck when the stream data processing system processes an enormous amount of stream data. As a result, there arises a problem in that the users cannot be provided with significant information in real time when the amount of stream data increases.

(2) In order to increase speed of converting the stream data into significant information, a technique of storing a replication of the external data on the stream data processing system is conceived. However, the storage of the entire replication of the external data on the storage data processing system is inefficient because a computer resource for storing the database replication is required. Moreover, when a database capacity is large, it is believed that the storage of the replication in the storage data processing system is impossible. Therefore, a reduction in amount of replication of the external data while keeping processing performance for providing significant information in real time is also an object to be achieved.

(3) It is still another object to reflect update on the replication of the external data on the stream data processing system even when the external data is updated to enable the stream data processing.

The present invention has been made in view of the above problems and has a first object of providing a system which cooperates with external data and performs a stream data processing in real time. A second object of the present invention is to provide a system for reducing an amount of replication of the external data while maintaining the real-time processing. Finally, a third object of the present invention is to provide a system which reflects update on the replication of the external data on the stream data processing system even when the external data is changed to enable precise execution of the stream data processing.

In order to achieve the first object described above, the present invention provides a mechanism of replicating at least a part of the external data in a stream predict cache provided in a storage system as needed to use the replication to cooperate with the stream data. In order to achieve the second object, the present invention provides a mechanism of reducing the amount of replication of the external data while maintaining the real-time processing by narrowing a target external data to be obtained with a use of characteristic information of the stream data that describes a two-dimensional condition corresponding to a combination of a time and a value range for an attribute value of the stream data registered in the system by a user or an application.

Further, as another means of achieving the second object, the present invention provides a mechanism of predicting the target external data to be obtained, which is required to cooperate with the stream data, by using the stream data characteristic information and monitoring information obtained by monitoring the stream data.

Finally, in order to achieve the third object, the present invention provides a mechanism of receiving an update instruction of the replication of the external data by the user or the application and reflecting the update on the replication of the external data on the stream data processing system to enable the stream data processing. As another means of achieving the third object, there is provided a mechanism of detecting a change in the external data, creating data assigned with a time of the change, and transmitting the data to the stream data processing system to reflect the update on the replication of the external data on the stream data processing system, thereby enabling the stream data processing.

By employing the present invention, the stream data processing system which enables a real-time data processing with high reliability and availability can be realized.

BRIEF DESCRIPTION OF THE DRAWINGS

FIG. 5 is a view exemplifying relation data, illustrating a product management table.

FIG. 6 is a view exemplifying the relation data, illustrating an order table.

FIG. 7 is an explanatory view showing an example of description of a suitable command when registering a query in a stream data processing system.

FIG. 10 is a view illustrating an example of a configuration of a registered query management table.

FIG. 11A is an explanatory view showing an example of a monitoring information management table at a time 10:00, FIG. 11B is an explanatory view showing an example of the monitoring information management table at a time 10:10, and FIG. 11C is an explanatory view showing an example of the monitoring information management table at a time 10:20.

FIG. 12 is a view showing an exemplary configuration of a stream characteristic management table.

FIG. 16 is a view showing an exemplary configuration of an SPC management table, illustrating an SPC management table at a timestamp 10:00.

FIG. 17 is a view showing an exemplary configuration of the SPC management table, illustrating the SPC management table at a timestamp 10:10.

FIG. 18 is a view showing an exemplary configuration of the SPC management table, illustrating the SPC management table at a timestamp 10:20.

FIG. 21A is an explanatory view showing an example of an SPC acquisition instruction at a time 10:00, FIG. 21B is an explanatory view showing an example of an SPC acquisition instruction at a time 10:10, and FIG. 21C is an explanatory view showing an example of an SPC acquisition instruction at a time 10:20.

FIG. 22A is a view showing SPC_OM data and SPC_OD data obtained by the SPC acquisition instructions at a time 10:00, FIG. 22B is a view showing SPC_OM data obtained by the SPC acquisition instructions at a time 10:10, and FIG. 22C is a view showing SPC_OM data obtained by the SPC acquisition instructions at a time 10:20.

FIG. 24 is an explanatory view showing an example of a log.

FIG. 25 is an explanatory view showing an example of a data matching result.

FIG. 26 is an explanatory view showing a registered query management table when a memory upper limit value in a memory upper limit value column is set for each relation corresponding to a target of data matching.

DETAILED DESCRIPTION OF THE PREFERRED EMBODIMENT

Hereinafter, a preferred embodiment of the present invention will be described.

Figure 1:
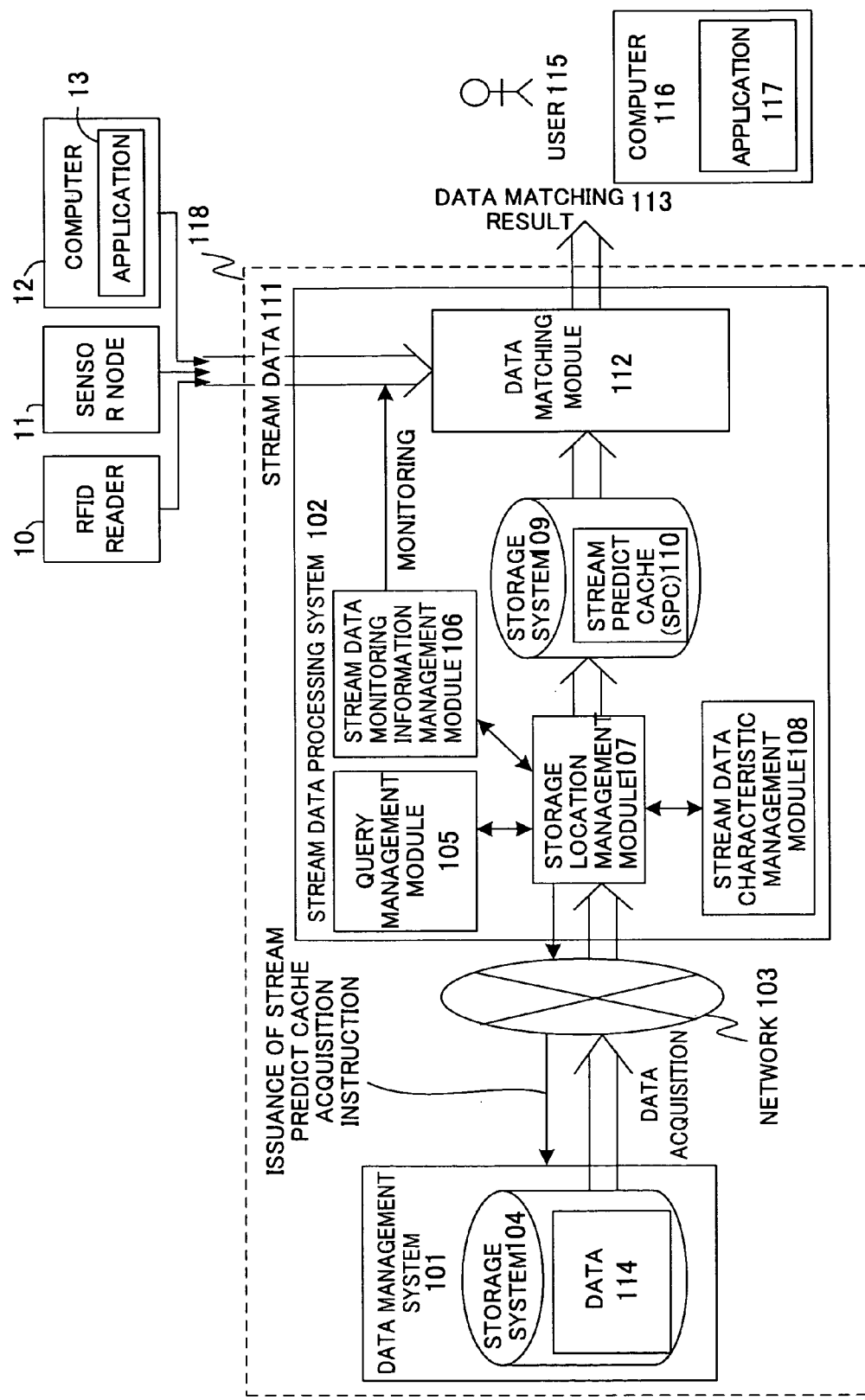
FIG. 1 is a block diagram showing a schema of a stream data processing system according to an embodiment of the present invention and system configurations related thereto.

FIG. 1 is a schematic view of a stream data processing system, to which an embodiment of the present invention is applied, and system configurations related thereto.

In FIG. 1, a data management system 101 including a storage system 104 is connected to a stream data processing system 102 over a network 103. The network 103 may be a local area network (LAN) connected through the Ethernet, an optical fiber, or a fibre distributed data interface (FDDI), or a wide area network (WAN) including the Internet at lower speed than the LAN. Each of the data management system 101 and the stream data processing system 102 consists of an arbitrary computer system such as a personal computer or a workstation. To be specific, the data management system 101 is a computer which executes a database management system (DBMS) for performing the management of a database (data 114), whereas the stream data processing system 102 is a computer (or a server) which executes a stream data processing for converting stream data 111 to significant information and providing the obtained significant information to a client computer 116.

A computer 12 which outputs the stream data to the stream data processing system 102 is connected to the network 103. The computer 12 manages products manufactured in a factory or the like. The computer 12 according to this embodiment outputs as the stream data information consisting of the combination of an identifier of a manufacturing line, on which a product is manufactured, an identifier of the product, and manufacture date/time. In the factory managed by the computer 12, a plurality of types of products are manufactured on a plurality of manufacturing lines. Then, the computer 12 obtains information of the product manufactured on each of the manufacturing lines via an RFID reader, a barcode reader, or the like to transmit the information of the products obtained on the plurality of manufacturing lines to the stream data processing system 102 in real time. The computer 12 also executes an application 13 for outputting the stream data 111. An RFID reader 10 and a sensor node 11 may be connected to the stream data processing system 102 to allow the stream data processing system 102 to receive the stream data 111 as shown in FIG. 1.

The stream data treated in this embodiment differs from a stream used in distribution of images or sounds. One stream data corresponds to significant information. The stream data received by the stream data processing system 102 from the computer 12 is continuous or intermittent. Each stream data contains information of a different product or a different element.

The stream data processing system 102 includes: a query management module 105; a stream data monitoring information management module 106; a storage location management module 107; a stream data characteristic management module 108; a storage system 109; and a data matching module 112.

The query management module 105 manages a query registered by an application 117 executed on a client computer 116 through an operation of a user 115. The stream data monitoring information management module 106 monitors the stream data 111 input to the stream data processing system 102 to obtain and manage monitoring information (statistical information and the like of the stream data 111). The stream data characteristic management module 108 manages characteristic information of the stream data 111 corresponding to a characteristic of a value of the stream data after a processing time registered by the user 115 or an application 117 executed on the client computer 116.

The storage location management module 107 uses the registered query information managed by the query management module 105, and any one or both of the stream data monitoring information managed by the stream data monitoring information management module 106 and the characteristic information of the stream data managed by the stream data characteristic management module 108, to determine which data in the data 114 in the storage system 104 on the data management system 101 is to be read in the stream data processing system 102. Hereinafter, an area in the storage system 109, which stores the data read by the stream data processing system 102 from the data management system 101 (external data), is referred to as a stream predict cache (hereinafter, abbreviated as "SPC") 110. Then, the stream data processing system 102 issues a stream predict cache acquisition instruction (SPC acquisition instruction) to the data management system 101.

The data management system 101 receives the SPC acquisition instruction issued from the storage location management module 107 as an input and outputs at least a part of the data 114 in the storage system 104 to the stream data processing system 102. The storage location management module 107 stores the obtained data as the SPC 110 (SPC_OM 217 and SPC_OD 219 in FIG. 2) on the storage system 109. The storage system 109 is an arbitrary storage medium such as a memory or a disk drive.

The data matching module 112 performs data matching on the stream data 111 and the SPC 110 to output a data matching result 113 corresponding to significant information to the client computer 116.

In FIG. 1, the schema of the present invention will be described. The stream data processing system 102 performs data matching on the stream data 111 to be input and the data 114 in the data management system 101 based on the query and the characteristic of the stream data 111 registered by the user 115.

The user 115 registers the query in the query management module 105 and registers the characteristic of the stream data 111 in the stream data characteristic management module 108 by the application 117 of the computer 116. The characteristic of the stream data denotes, for example, a characteristic that the value of an ID of the stream data increments one by one, a characteristic that a value of one attribute is within a certain range, a characteristic that the value of one attribute of the stream data arriving in a certain time zone is within a certain range, and the like.

The stream data monitoring information management module 106 monitors the stream data 111 received by the stream data processing system 102 to retain, as monitoring information, the information regarding the tendency of the stream data 111 obtained by the monitoring. The information regarding the tendency of the stream data 111 is, for example, a data rate of the stream data 111 or statistical information of the distribution of values of one attribute and the like. The storage location management module 107 refers to the characteristic of the stream data 111 set in the stream data characteristic management module 108 and to the information regarding the tendency retained in the stream data monitoring information management module 106 to determine which data is to be stored in the SPC 110 for data matching. In the SPC 110, the data 114 in the stream data processing system 102, which is determined by the storage location management module 107, is read in advance and stored.

The data matching module 112 refers to the SPC 110 to be able to perform data matching on the received stream data and the data 114 read in advance, thereby providing the user 115 (the computer 116) with the data matching result 113 in real time.

To be specific, in the present invention, the data to be read in advance into the SPC 110 for data matching is determined by the storage location management module 107 based on the characteristic of the stream data 111 input by the user 115 and the statistical information monitored by the stream data monitoring information management module 106. As a result, cooperation with the external data (corresponding to the data 114 in the data management system 101 and denoting the data referred to by the stream data processing system) and the stream data processing in real time can be made possible with the amount of data 114 required for data matching being minimized.

Figure 2:
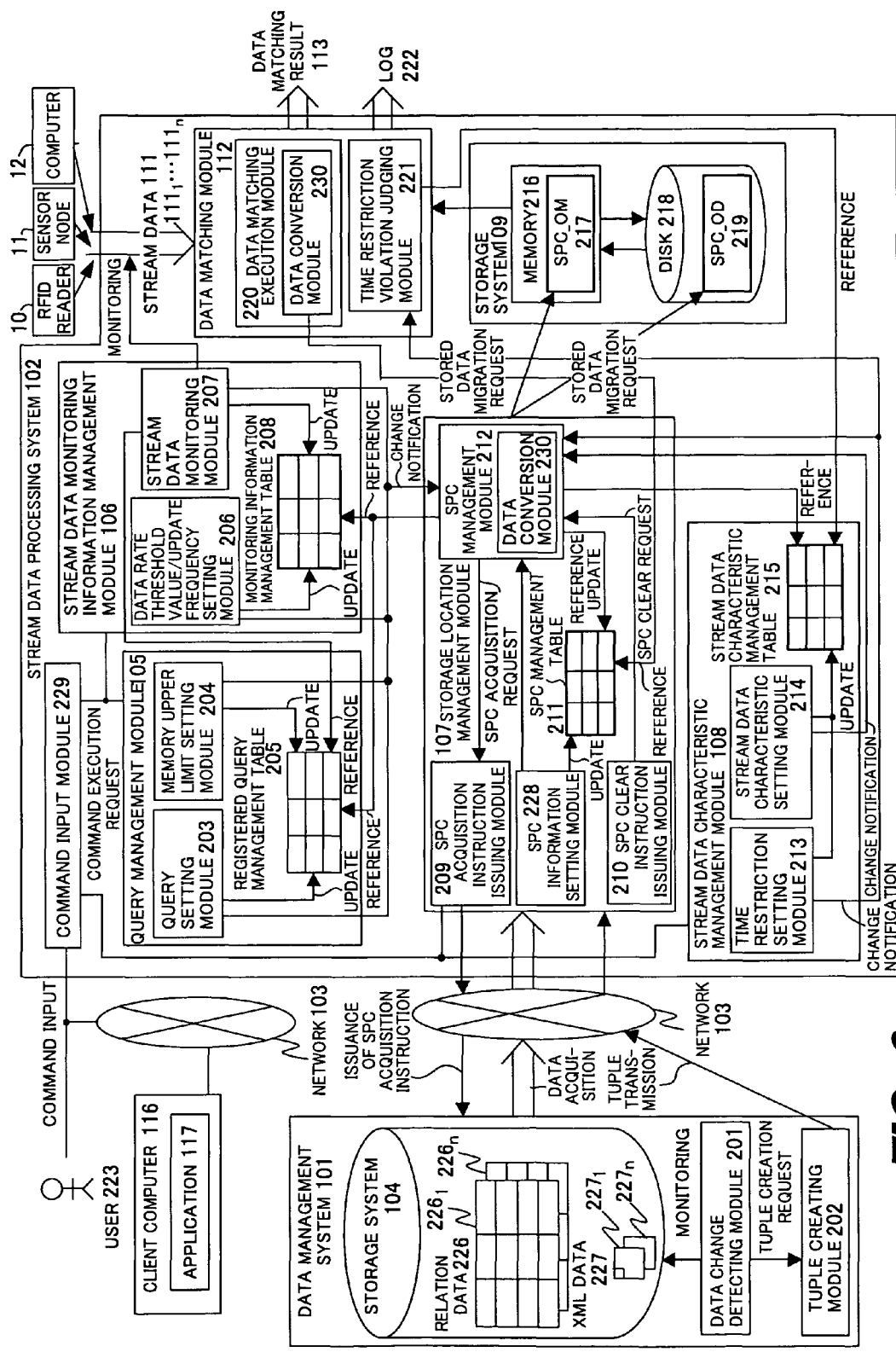
FIG. 2 is a block diagram showing the stream data processing, to which an embodiment of the present invention is applied, and the system configurations related thereto.

FIG. 2 is a block diagram showing the configurations of the stream data processing system according to one embodiment, to which the present invention is applied, and the systems related thereto.

In the stream data processing system 102, the query management module 105 includes a query setting module 203, a memory upper limit setting module 204, and a registered query management table 205.

The query setting module 203 includes an interface (hereinafter, referred to simply as "I/F") for registering and changing a query via a command input module 229 from the user 115 or the application 117 executed on the client computer 116. When the query is registered or changed, the query setting module 203 updates the registered query management table 205 to transmit a change notification to an SPC management module 212.

The memory upper limit setting module 204 includes an I/F for setting a memory upper limit value available for the query via the command input module 229 from the user 115 or the application 117 executed on the client computer 116. When the memory upper limit value is input, the memory upper limit setting module 204 updates the registered query management table 205 to transmit a change notification to the SPC management module 212.

The registered query management table 205 is a table for retaining information set in the query setting module 203 and the memory upper limit setting module 204.

The stream data monitoring information management module 106 includes a stream data monitoring module 207, a data rate threshold value/update frequency setting module 206, and a monitoring information management table 208.

The stream data monitoring module 207 refers to the registered query management table 205 to monitor the stream data 111 which requires to be monitored. When the stream data monitoring module 207 obtains the monitoring information (statistical information of the stream data 111) as a result of monitoring, the stream data monitoring module 207 updates the monitoring information management table 208 to transmit a change notification to the SPC management module 212. Herein, the stream data 111 to be monitored is not limited to those requiring to be monitored. All the stream data may be monitored instead.

The data rate threshold value/update frequency setting module 206 includes an I/F for setting a threshold value of the data rate for judging whether relation data 226 is to be cached or not and for registering and changing a frequency (intervals) of updating the monitoring information, for the stream data 111 required to be monitored. When the data rate threshold value and the update frequency are registered and changed, the data rate threshold value/update frequency setting module 206 updates the monitoring information management table 208 to transmit a change notification to the SPC management module 212. In FIG. 2, the relation data 226 and XML data 227 in the data management system 101 correspond to the data 114 in FIG. 1.

The monitoring information management table 208 is a table for retaining the information set or obtained in the data rate threshold value/update frequency setting module 206 and the stream data monitoring module 207.

The stream data characteristic management module 108 includes a stream data characteristic setting module 214, a time restriction setting module 213, and a stream data characteristic management table 215.

The stream data characteristic setting module 214 includes an I/F for inputting characteristic information of the stream data 111 via the command input module 229 from the user 115 or the application 117 executed on the client computer 116. When the characteristic information of the stream data 111 is input, the stream data characteristic setting module 214 updates the stream data characteristic management table 215 to transmit a change notification to the SPC management module 212.

The time restriction setting module 213 includes an I/F for inputting a time restriction which is a condition corresponding to time information in a corresponding column of the stream data 111. When the time restriction condition is input, the time restriction setting module 213 updates the stream data characteristic management table 215 to transmit a change notification to the SPC management module 212 and a time restriction violation judging module 221.

The stream data characteristic management table 215 is a table for retaining the information set in the stream data characteristic setting module 214 and the time restriction setting module 213.

The storage location management module 107 includes an SPC management module 212, an SPC management table 211, an SPC acquisition instruction issuing module 209, an SPC clear instruction issuing module 210, and an SPC information setting module 228.

Upon reception of an SPC acquisition request from the SPC management module 212, the SPC acquisition instruction issuing module 209 issues an SPC acquisition instruction for obtaining the SPC data corresponding to at least a part of the external data (relation data 226 in the data management system 101) required by the stream data 111 to the data management system 101. The SPC data denotes data stored (cached) in the SPC_OM 217 or the SPC_OD 219 on the storage system 109. As the storage system 109, an example of the storage system consisting of the memory 216 and the disk 218 is shown. The SPC 110 is composed hierarchically of the SPC_OM 217 on the memory 216 with high access speed but with a small capacity and the SPC_OD 219 on the disk 218 with low access speed but with a large capacity. The SPC 110 stores high-priority data in the SPC_OM 217 and low-priority data in the SPC_OD 219.

The SPC clear instruction issuing module 210 includes an I/F for issuing an SPC clear instruction via the command input module 229 from the user 115 or the application 117 executed on the client computer 116 or at given intervals when the relation data 226, which is the original of the data cached in the SPC_OM 217 or the SPC_OD 219, is updated in the data management system 101. When the SPC clear instruction is issued, the SPC clear instruction issuing module 210 outputs an SPC clear request to the SPC management module 212.

The SPC information setting module 228 includes an I/F for inputting the SPC information via the command input module 229 from the user 115 or the application 117 executed on the client computer 116. When the SPC information is input, the SPC information setting module 228 updates the SPC management table 211 to transmit a change notification to the SPC management module 212.

Upon reception of the change notification from the query setting module 203, the memory upper limit setting module 204, the data rate threshold value/update frequency setting module 206, the stream data monitoring module 207, the stream data characteristic setting module 214, the time restriction setting module 213, or the SPC information setting module 228, the SPC management module 212 refers to the registered query management table 205, and any one or both of the monitoring information management table 208 and the stream data characteristic management table 215 to determine the SPC data to be read into the stream data processing system 102, from among the relation data 226 on the data management system 101. Then, the SPC management module 212 determines a location where the SPC data is to be stored, and then updates the SPC management table 211. When receiving the change notification or receiving the SPC clear request from the SPC clear instruction issuing module 210, the SPC management module 212 outputs the SPC acquisition request to the SPC acquisition instruction issuing module 209. The SPC management module 212 refers to the SPC management table 211 to store the SPC data received from the data management system 101 in a stream predict cache on memory (hereinafter, referred to as "SPC_OM: SPC_OnMemory") 217 on the memory 216 and a stream predict cache on disk (hereinafter, referred to as "SPC_OD: SPC_OnDisk") 219 on the disk 218 in the storage system 109. The two SPC_OM 217 and SPC_OD 219 can be used separately; the SPC data having a greater need for the real-time processing is stored in the SPC_OM 217 with higher access speed, whereas the stream data 111 at a lower data rate is stored in the SPC_OD 219 with lower access speed.

A data conversion module 230 is provided in the SPC management module 212. The data conversion module 230 includes a mechanism of converting a data format to a record format when the data in the storage system 104 is not the relation data such as the XML data 227. As a result, the XML data 227 can be used in the same manner as the relation data 226.

The SPC management table 211 is a table for retaining the storage location information determined by the SPC management module 212.

The data management system 101 includes the storage system 104, a data change detecting module 201, and a tuple creating module 202.

The storage system 104 is composed of any one or both of the relation data 226 and the XML data 227. The relation data 226 is composed of a plurality of pieces of relation data $226_1$, $226_2$ to $226_n$, whereas the XML data 227 is composed of a plurality of pieces of XML data $227_1$, $227_2$ to $227_n$. The data stored in the storage system 104 may be in any data format, such as a CSV file, in addition to the data described above. Hereinafter, an example using the relation data 226 will be described.

The data change detecting module 201 monitors a change in the relation data 226. When detecting any change, the data change detecting module 201 outputs a tuple creating request to the tuple creating module 202.

Upon reception of the tuple creating request from the data change detecting module 201, the tuple creating module 202 creates streamed tuples for the changed relation data and transmits the created tuples to the SPC management module 212. The tuple corresponds to a record of the relation data 226, and denotes data (attribute value) for data matching with the stream data 111.

When the SPC clear instruction issuing modules 210 is provided, the data change detecting module 201 and the tuple creating module 202 are not necessarily required. On the other hand, when the data change detecting module 201 and the tuple creating module 202 are provided, the SPC clear instruction issuing module 210 is not necessarily required.

The storage system 109 consists of the memory 216 and the disk 218.

In the memory 216, the SPC_OM 217 is provided to retain the SPC data transmitted from the SPC management module 212. The data in the SPC_OM 217 is input to the data matching module 112.

In the disk 218, the SPC_OD 219 is provided to retain the SPC data transmitted from the SPC management module 212.

In response to a data migration request from the SPC management module 212, the SPC_OM 217 and the SPC_OD 219 moves the data between the memory 216 and the disk 218. Although a hierarchical structure composed of the memory 216 and the disk 218 is provided in this embodiment, the structure may only include the memory 216.

The stream data 111 is composed of a plurality of pieces of stream data $111_1$, $111_2$ to $111_n$.

The data matching module 112 includes a data matching execution module 220 and the time restriction violation judging module 221.

The data matching execution module 220 obtains the data in the SPC_OM 217 in the memory 216 and performs data matching on the obtained data and the stream data 111 to output the data matching result 113.

The data conversion module 230 is provided in the data matching execution module 220. The data conversion module 230 has a mechanism of converting the data format to the record format when the data in the storage system 104 is not the relation data such as the XML data 227, or when the stream data is not in a record format such as the XML format.

The time restriction violation judging module 221 refers to the time restriction condition retained in the stream data characteristic management table 215 to judge whether the stream data 111 violates the condition or not. When the stream data 111 violates the condition, the time restriction violation judging module 221 outputs violation information to a log 222. The log 222 is transmitted to, for example, the client computer 116. The log 222 may be stored in the storage system 104 of the data management system 101 and the like.

Figure 3:
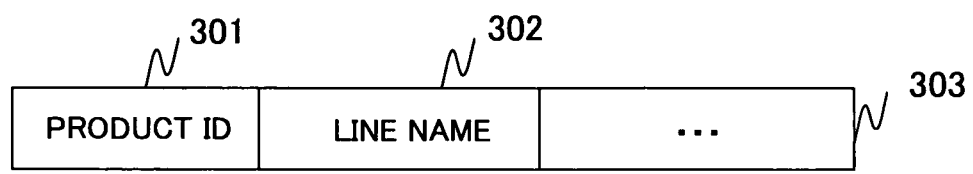
FIG. 3 is a view schematically showing an example of a suitable data format of stream data.

FIG. 3 is a view schematically showing an example of a suitable data format of the stream data 111.

The stream data 111 is in a record format. A product ID column 301 and a line name column 302 constituting a record respectively correspond to segments. The combination of the product ID column 301 and the line name column 302 forms a tuple 303. When the stream data 111 is input to the stream data processing system, a timestamp indicating the arrival time of the stream data 111 is assigned. The timestamp may be assigned in a stream data source.

Figure 4:
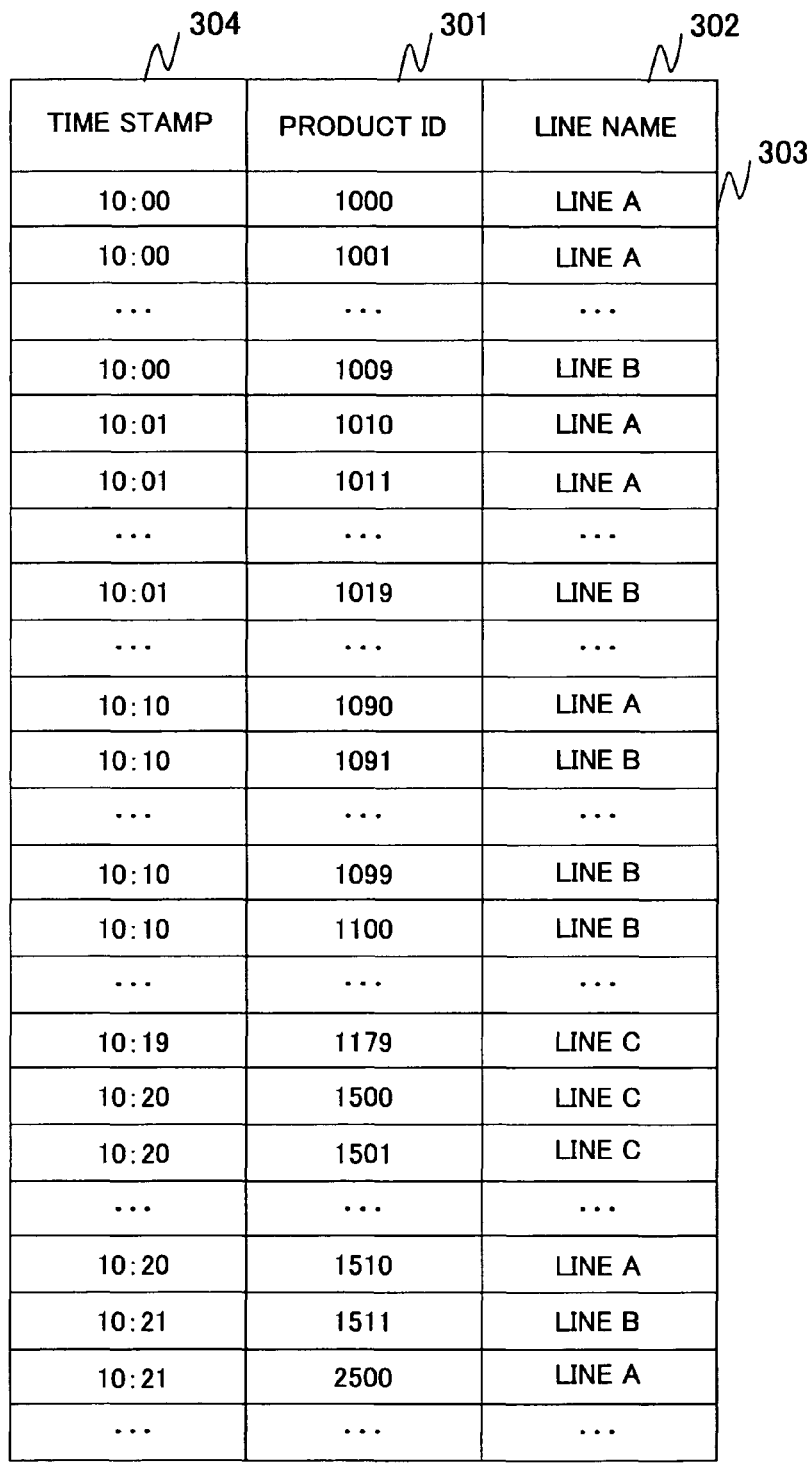
FIG. 4 is a view exemplifying the continuously input stream data, illustrating a product stream.

FIG. 4 is a view exemplifying the continuously input stream data 111, illustrating a product stream (S1) $111_1$.

In the product stream $111_1$, one row in the table of FIG. 4 corresponds to the tuple 303. A timestamp column 304 corresponding to the arrival time of each tuple is assigned to the tuple 303. For example, the tuple 303 is shown as a tuple with a value of the timestamp column 304 "10:00", a value of the product ID column 301 "1000", and a value of the line name column 302 "line A".

Although the timestamp is represented in a format of hour and minute such as "10:00" in this embodiment, the timestamp may be represented in another format as represented by a format even containing a date and second as "2006/2/3, 9:00:00, JST".

FIG. 5 is a view exemplifying the relation data 226, illustrating a product management table (R1) $226_1$.

The product management table is composed of a product ID column 401, a product name column 402, and a price column 403. One row in the product management table corresponds to a record.

For example, a record 404 is shown to include a value of the product ID column 401 "1000", a value of the product name column 402 "product A", and a value of the price column 403 "5000".

FIG. 6 is a view exemplifying the relation data 226, illustrating an order table (R2) $226_2$.

The order table is composed of an order ID column 501, a product ID column 502, and an orderer name column 503. One row in the table corresponds to a record.

For example, a record 504 is shown to include a value of the order ID column 501 "10000", a value of the product ID column 502 "1000", and a value of the orderer name column 503 "orderer A".

FIG. 7 shows an exemplary description of a suitable command for registering the query in the stream data processing system 102.

A registered query 1201 is registered in the query setting module 203 via the command input module 229 from the user 115 or the application 117 executed on the client computer 116. The registered query 1201 is shown as a query of extracting the order ID column 501, the product ID column (301, 402 or 502), the product name column 402, the line name column 302, and the orderer name column 503 from the rows, each including the same product ID column 301 in the product stream $111_1$, the same product ID column 402 in the product management table $226_1$, and the same ID column 502 in the order table $226_2$, and also the "orderer A" in the orderer column 503 in the order table $226_2$, in the last fifty rows ([Rows 50]) in the product stream (S1) $111_1$, the product management table (R1) $226_1$, and the order table (R2) $226_2$.

Hereinafter, a procedure of a data matching processing executed in the stream data processing system 102 is shown in a flowchart of FIG. 8, and will be described with reference to FIG. 2.

In the data matching processing executed in the stream data processing system 102, the SPC management module 212 judges whether or not the registration or change of the query registered via the command input module 229 from the user 115 or the application 117 executed on the client computer 116 has been accepted in response to the change notification issued from the query setting module 203 (S2002).

When it is judged "yes" in Step S2002, a processing for registering and changing the query described below will be performed (S2003). After the completion of Step S2003 or when it is judged "no" in Step S2002, the SPC management module 212 judges whether or not the monitoring information and the setting information have been changed in response to the change notification issued from the memory upper limit setting module 204, the data rate threshold value/update frequency setting module 206, the stream data monitoring module 207, the stream data characteristic setting module 214, or the time restriction setting module 213 (S2004).

When it is judged "yes" in Step S2004, a processing for changing the monitoring information and the setting information described below is performed (S2005). After Step S2005 is completed or when it is judged "no" in Step S2004, a processing for updating the relation data described below is performed (S2006). Then, the data matching execution module 220 judges whether or not the stream data 111 has arrived (S2007).

When it is judged "yes" in Step S2007, the data matching execution module 220 performs a data matching processing on the received stream data 111 and the data in the SPC 110 as described below (S2008). After the completion of Step S2008 or when it is judged "no" in Step S2007, the command input module 229 judges whether or not the system is to be ended based on the input of a system end command (S2009).

When it is judged "yes" in Step S2009, the processing is terminated (S2010). On the other hand, when it is judged "no" in Step S2009, the processing returns to Step S2002 to continue the above-mentioned processing.

The above-mentioned processing is a main routine of the processing executed in the stream data processing system 102. The stream data 111 is accepted while updating the query or the monitoring information, the relation data 226 or the SPC data, or the like to carry out the data matching processing.

Figure 8:
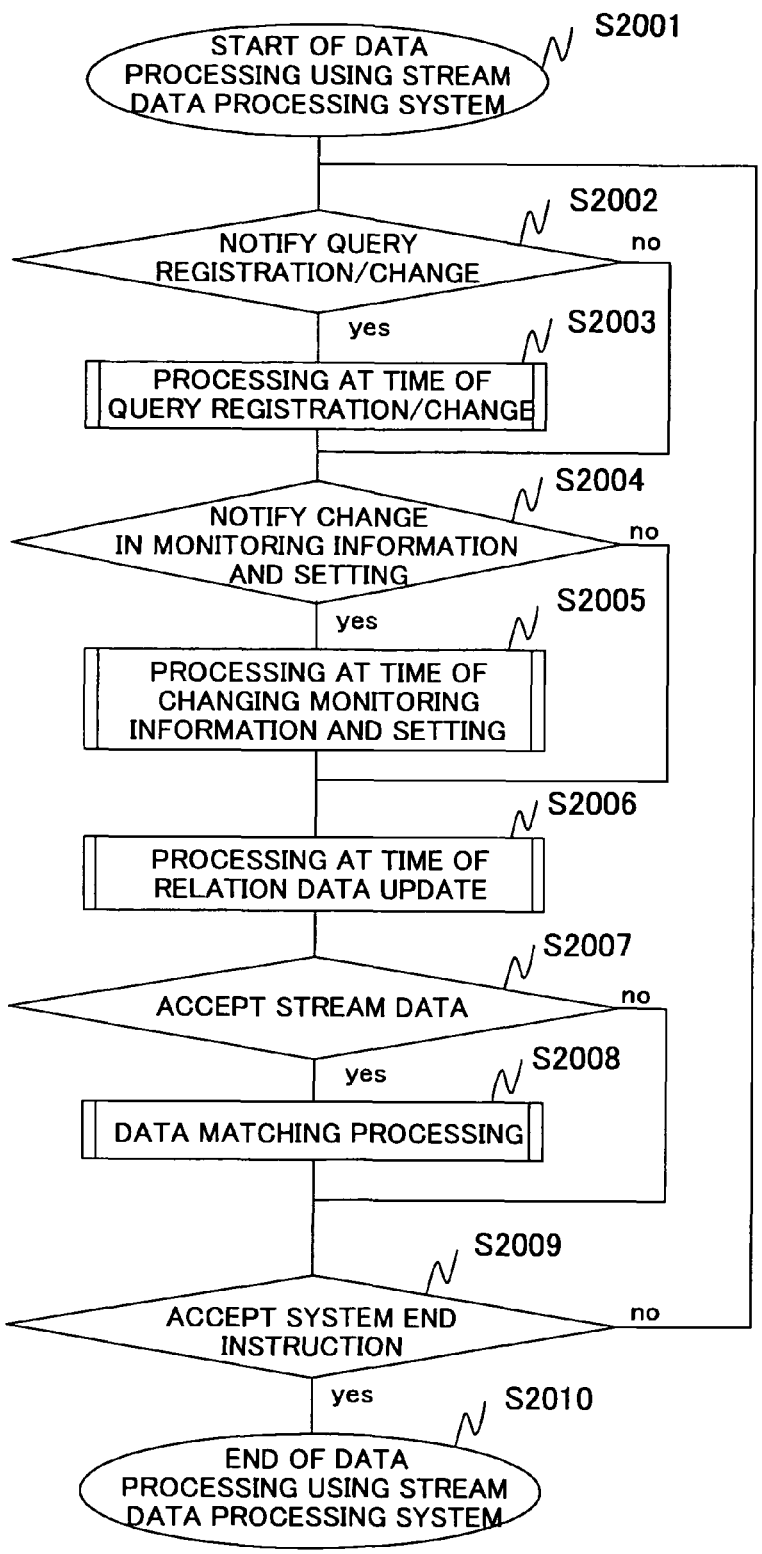
FIG. 8 is a flowchart illustrating a processing procedure of a data matching processing using the stream data processing system.
Figure 9:
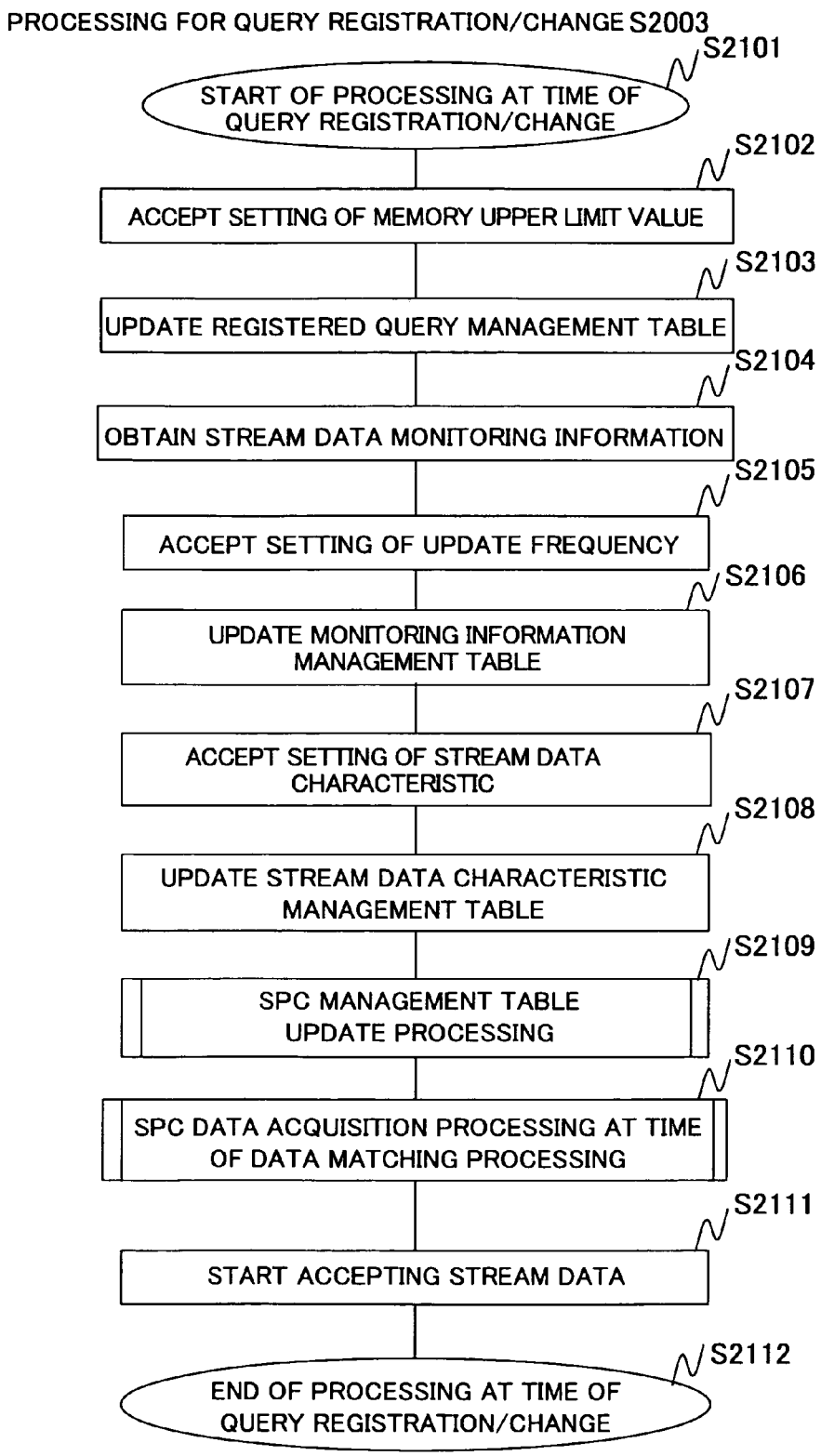
FIG. 9 is a flowchart illustrating a processing procedure of a processing at times of query registration and change.

Next, a processing procedure for registering and changing the query in Step S2003 shown in FIG. 8 is shown in FIG. 9. The processing procedure in Step S2003 is described with reference to FIGS. 2, 10, 11A to 11C, and 12.

In the processing for registering and changing the query, first, the memory upper limit setting module 204 accepts a memory upper limit value of the registered or changed query (S2102) and reflects the registration/change information of the query and the memory upper limit value on the registered query management table 205 (S2103).

Next, the stream data monitoring module 207 refers to the registered query management table 205 to obtain the monitoring information of the stream data required to be monitored, for the registered query (S2104). The stream data monitoring module 207 sets an update interval of the monitoring of the stream data required to be monitored (S2105) and then reflects the obtained stream data monitoring information on the monitoring information management table 208 (S2106).

Next, the stream data characteristic setting module 214 accepts the characteristic information of the stream data (S2107) and reflects the accepted characteristic information on the stream data characteristic management table 215 (S2108).

Next, a processing of updating the SPC management table 211 described below is performed (S2109). Then, an SPC acquisition processing of reading the relation data 226 in the SPC 110 for the data matching processing described below is performed (S2110).

Finally, the data matching module 112 starts accepting the stream data 111 (S2111) and then terminates the processing for registering and changing the query (S2112).

By the above-mentioned processing, the query, the memory upper limit setting value, the update frequency, and the characteristic of the stream data 111 input by the user 115 from the client computer 116 are set in the respective tables in the stream data processing system 102.

FIG. 10 is a view showing an exemplary configuration of the registered query management table 205.

In a query name column 601, a name of the registered query is stored. In a registered query column 602, the registered query is stored.

In a memory upper limit value column 603, an upper limit value of a memory usage set in the memory upper limit setting module 204 is stored. In a query execution format storage destination column 604, an address (pointer) of a storage destination of the query execution format is stored. By creating the execution format in advance, the overhead for performing compilation for each execution of the query can be reduced.

A query registrant name obtained for registration of the query and a query registration date/time are respectively stored in a registrant name column 605 and a registration date/time column 606 to be used for access management and security management of the system.

A stream name and a relation name corresponding to a query execution target extracted from the registered query are respectively stored in an execution target stream column 607 and an execution target relation 608.

For example, a row 609 shows the registered query management table 205 when the memory upper limit value is set to "10 MB" for the registered query 1201 shown in FIG. 7 in the memory upper limit setting module 204.

The row 609 is shown to have a value of the query name column 601 "Q1", a value of the registered query column 602 "SELECT order ID, product ID, product name, line name, orderer name, FROM S1 [ROWS 50], R1, R2, WHERE S1. product ID=R1. product ID AND R1. product ID=R2. product ID and R2. orderer=orderer A;", a value of the memory upper limit value column 603 "10 MB", a value of the query execution format storage destination 604 "0x7FFFAEE1", a value of the registrant name column 605 "Kashiyama", a value of the registration date column 606 "2006/02/01 13:07:26 JST", a value of the execution target stream column 607 "S1", and a value of the execution target relation 608 "R1, R2".

FIGS. 11A to 11C are views, each showing an exemplary configuration of the monitoring information management table 208. Monitoring information management tables $208_1$, $208_2$, and $208_3$ show the monitoring information management table 208 at the timestamps of 10:00, 10:10 and 10:20, respectively.

In FIGS. 11A to 11C, a stream name to be monitored and a column name to be monitored, which are obtained by referring to the registered query management table 205, are stored in a stream name column 801 and a column name column 802, respectively.

In a data rate column 803, an arrival rate of the stream data to be monitored in the monitoring information obtained in the stream data monitoring module 207 is stored. The acquisition of the data rate allows the prediction of the amount of the stream data which will arrive subsequently. In a data rate threshold value column 804, the data rate threshold value set in the data rate threshold value/update frequency setting module 206 is stored. By using the data rate threshold value, the relation data 226 is judged to be cached or not.

In a current value column 805, the latest value of the column name to be monitored at the time when the monitoring information is obtained in the monitoring information obtained in the stream data monitoring module 207 is stored. In a statistical value column 806, a statistical value at the time when the monitoring information is obtained in the monitoring information obtained in the stream data monitoring module 207 is stored. In a timestamp column 807, time information at which the monitoring information is obtained in the stream data monitoring module 207 is stored.

In an update frequency column 808, the update interval of the monitoring information set in the data rate threshold value/update frequency setting module 206 is stored.

For example, a row $809_1$ shows the monitoring information management table $208_1$ when the data rate threshold value is set to "5 tuples/minute" and the update frequency is set to "10 minutes" in the data rate threshold value/update frequency setting module 206.

The row $809_1$ is shown to have a value of the stream name column 801 "S1", a value of the column name column 802 "product ID", a value of the data rate column 803 "10 tuples/minute", a value of the data rate threshold value column 804 "5 tuples/minute", a value of the current value column 805 "1000", a value of the statistic value 806 "-" (no data), a value of the timestamp column 807 "10:00", and a value of the update frequency column 808 "10 minutes".

In a row $809_2$ in FIG. 11B, the value of the data rate column 803 is changed to "9 tuples/minute" and the value of the current value column 805 is changed to "1090" at 10:10. In a row $809_3$ in FIG. 11C, the value of the data rate column 803 is changed to "8 tuples/minute" and the value of the current value column 805 is changed to "1180" at 10:20.

The format of tuples/minute is shown as an example of the data stored in the data rate 803 in the present invention. However, the data format is not limited thereto. The data stored in the statistical value column 806 is the statistical information after the time of obtaining the monitoring information. However, statistical information obtained previously to the time may also be used. Moreover, a center value and a mean value are shown as the statistical values. However, other statistical information such as a variance may be used. Further, a part of the characteristic information of the stream data described below may be obtained by monitoring the stream data.

The whole information is not required to be input to the data rate threshold value column 804 and the update frequency column 808. If the information is not input, the previously set value may be used.

As the monitoring information acquisition data stored in the data rate column 803, the current value column 805 and the statistical value column 806, the whole information is not required to be input.

FIG. 12 is a view showing an exemplary configuration of the stream characteristic management table 215.

In a stream name column 701, a name of the query, for which the characteristic information of the stream data is input, is stored. In a column name column 702, a column name of the column, to which the characteristic information in the query is input, is stored. In a time-related condition column 703 and a value-related condition column 704, a condition regarding the timestamp and a condition showing a characteristic of the value are stored, respectively. The time-related condition column 703 and the value-related condition column 704 are used in combination. In a condition priority column 705, the order of priority is stored. The condition priority column 705 determines which condition is used by priority for a plurality of stream characteristics. In a restriction judgment flag column 706, a flag is stored as Y when the input is made in the time restriction setting module 213. In a fixed condition flag column 707, a flag is stored as Y when the characteristic information of the stream data is satisfied or is supposed to be satisfied without fail. In a registrant column 708, a name of a registrant who has registered the characteristic information of the stream data is stored.

For example, a row 709 indicates that the stream data with the stream name "S1" with the "product ID" in the range of "1000 to 1500" at "10:00 to 10:20" is "processed by priority". Moreover, the row 709 indicates that the stream data is "judged whether or not it violates the condition" and "the condition is satisfied or is supposed to be satisfied without fail". Further, the row 709 indicates that the above-mentioned contents are registered by the registrant "Kashiyama".

Besides the input in the table format shown in FIG. 12, the I/F for inputting the characteristic information of the stream data may input the characteristic information by a command. The stream name column 701 and the column name column 702, to which the characteristics are input, may be obtained by referring to the registered query management table 205. To the time-related column 703, the condition priority column 705, the restriction judgment flag column 706, the fixed condition flag column 707, and the registrant column 708, the whole information is not required to be input. If the information is not input, a previously set value may be used.

Figure 13:
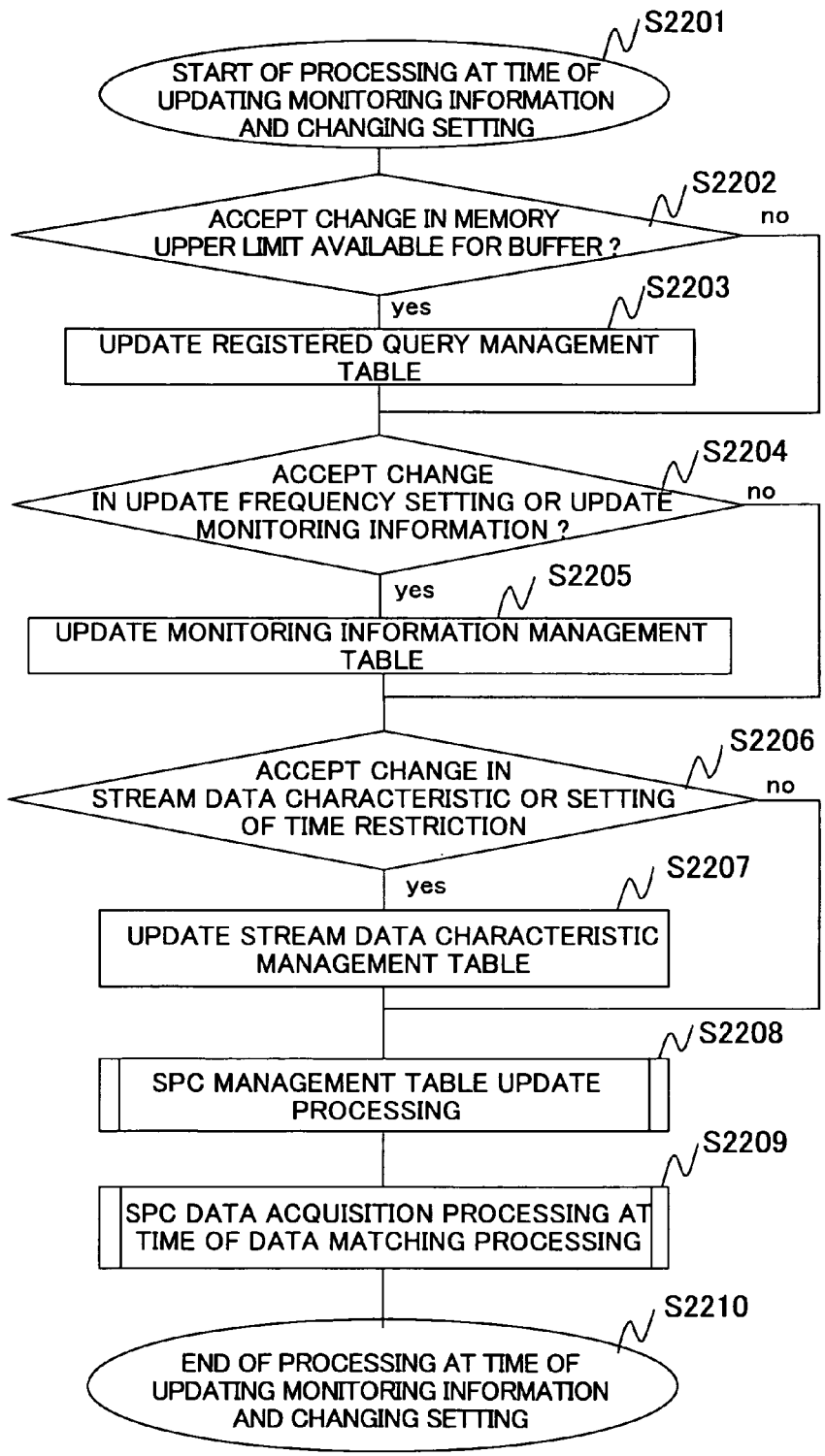
FIG. 13 is a flowchart showing a processing procedure of a processing at times of changing monitoring information and setting.

Next, the processing for updating the monitoring information and changing the setting in Step S2005 shown in FIG. 8 will be described with reference to FIGS. 13 and 2.

In the processing for updating the monitoring information and changing the setting, it is first judged whether or not the memory update limit setting module 204 has accepted the upper limit value of the memory that the registered query can be used for a buffer (S2202). When it is judged "yes" in Step S2202, the memory upper limit value is reflected on the registered query management table 205 (S2203).

After the completion of Step S2203 or when it is judged "no" in Step S2202, it is judged whether or not the data rate threshold value/update frequency setting module 206 has accepted the change in update interval of the stream data monitoring information or whether or not the stream data monitoring module 207 has updated the monitoring information (S2204). When it is judged "yes" in Step S2204, the update interval of the monitoring information or the updated monitoring information is reflected on the monitoring information management table 208 (S2205).

After the completion of Step S2205 or when it is judged "no" in Step S2204, it is judged whether or not the stream data characteristic has been changed in the stream data characteristic setting module 214 or whether or not the time restriction has been set in the time restriction setting module 213 (S2206). When it is judged "yes" in Step S2206, the characteristic information of the stream data or the time restriction information is reflected on the stream data characteristic management table 215 (S2207).

After the completion of Step S2207 or when it is judged "no" in Step S2206, the SPC management table update processing described below is performed as in Step S2109 shown in FIG. 9 (S2208). Then, the SPC acquisition processing for the data matching processing described below is performed (S2209) to terminate the processing of updating the monitoring information and changing the setting (S2210).

Figure 14:
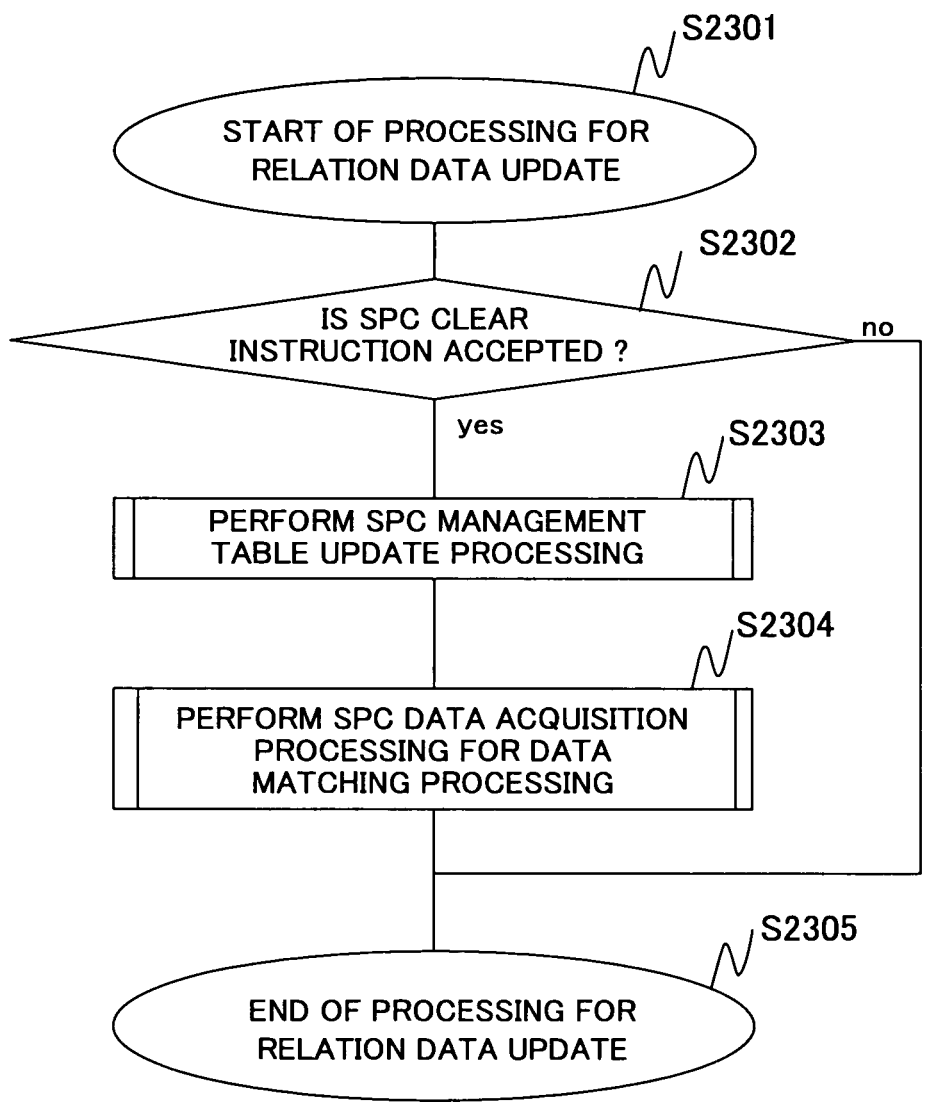
FIG. 14 is a flowchart showing a processing procedure of a processing at a time of relation data update.

Next, a procedure of the processing of relation data update in Step S2006 shown in FIG. 8 is shown in a flowchart of FIG. 14. The processing procedure will be described below with reference to FIG. 2.

In the processing of relation data update, it is first judged whether the SPC clear instruction issuing module 210 has accepted the SPC clear command input via the command input module 229 from the user 115 or the application 117 executed on the client computer 116 or at given intervals (S2302). When it is judged "yes" in Step S2302, the SPC management table update processing described below is performed as in Step S2109 of FIG. 9 (S2303). Then, the SPC acquisition processing for the data matching processing described below is performed (S2304). After Step S2304 or when it is judged "no" in Step S2302, the processing of relation data update is terminated (S2305).

By the processing described above, upon issue of the SPC clear instruction, the SPC management table 211 and the SPC 110 are updated.

Figure 15:
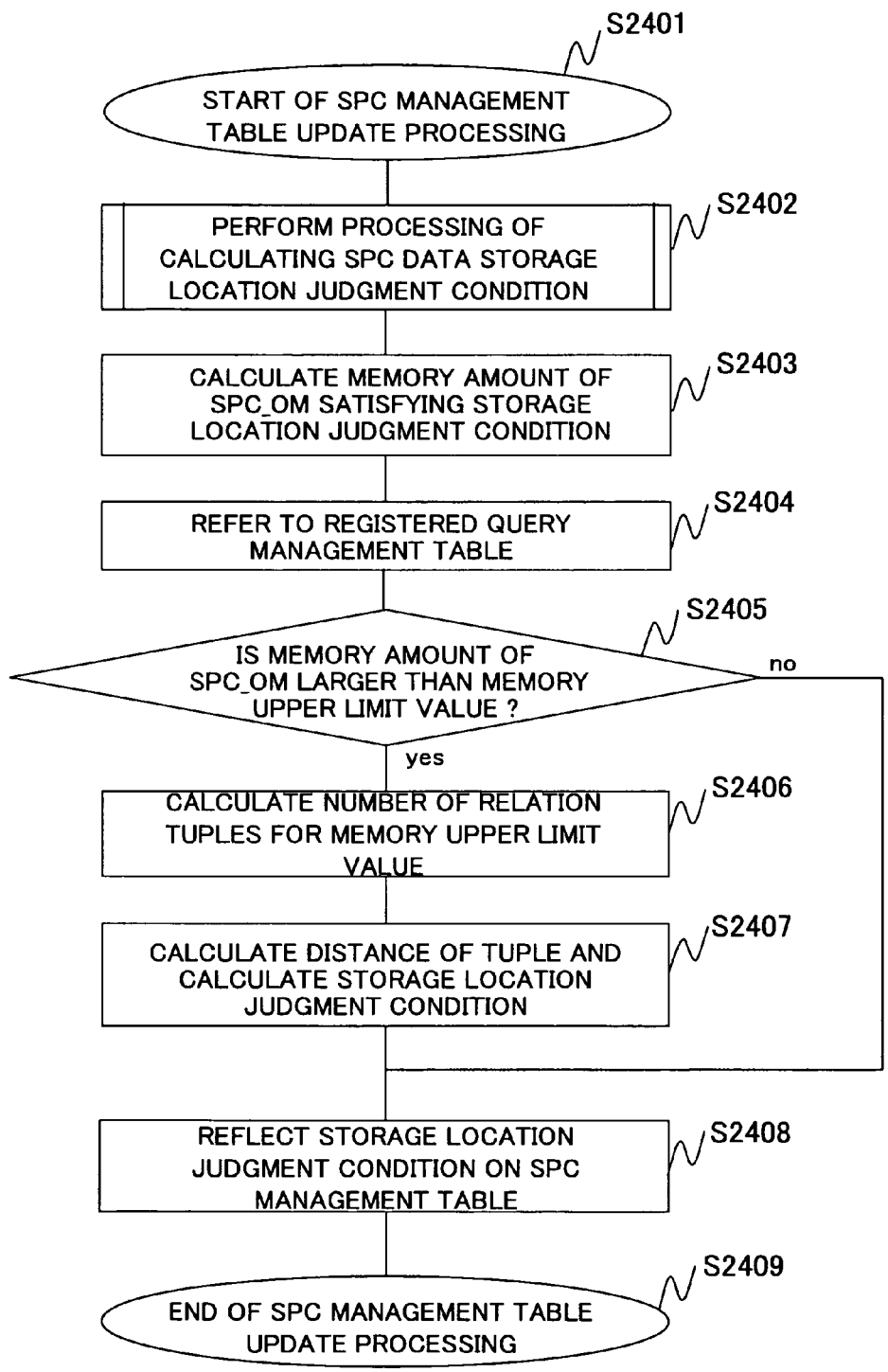
FIG. 15 is a flowchart showing a processing procedure of an SPC management table update processing.
Figure 23:
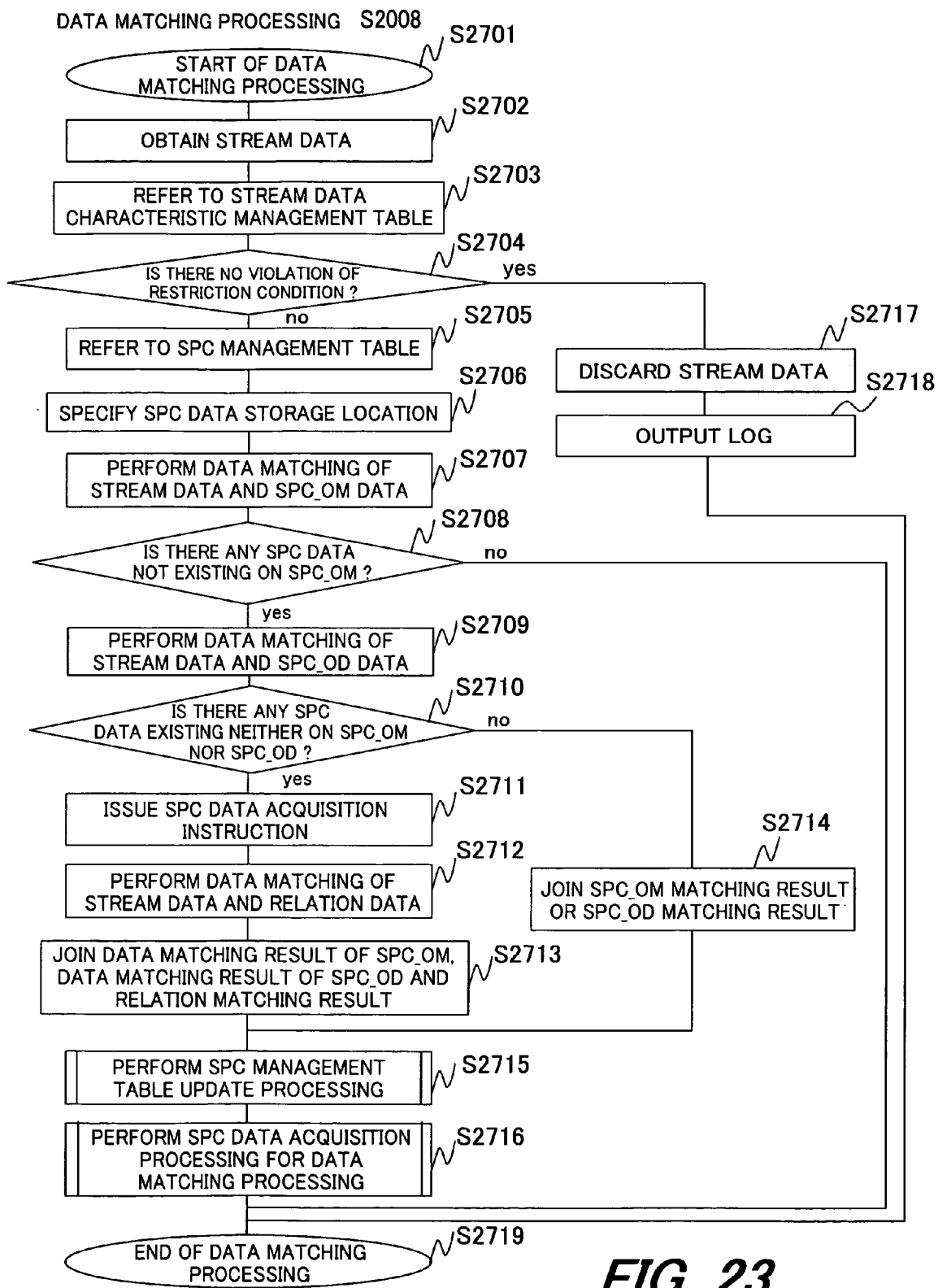
FIG. 23 is a flowchart showing a processing procedure of a data matching processing.

Next, a procedure of the SPC management table update processing invoked in Step S2109 in FIG. 9, in Step S2208 in FIG. 13, in Step S2303 in FIG. 14, and Step S2715 in FIG. 23 is shown in a flowchart of FIG. 15, and will be described with reference to FIGS. 2, 16, 17 and 18.

In the SPC management table update processing, a processing of calculating the SPC storage location judgment condition described below is performed in the SPC management module 212 (S2402). Then, a memory usage of the SPC data stored in the SPC_OM 217 which satisfies the storage location judgment condition calculated in Step S2402 is calculated (S2403). Next, the SPC management module 212 refers to the registered query management table 205 (S2404) to judge whether or not the calculated memory usage is larger than the memory upper limit column 603 stored in the registered query management table 205 (S2405).

When it is judged "yes" in Step S2405, the number of tuples of the relation records for the memory upper limit value is calculated (S2406). Then, in the order of smaller distances of the tuples, the number of relation record tuples for the memory upper limit value calculated in Step S2406 is stored in the memory 216 to calculate the storage location judgment condition of the SPC_OM 217 (S2407).

The distance of the tuple is judged based on a predefined distance function. For example, when a distance function using a difference obtained by the comparison between the attribute value of the stream data and the current value as a distance is defined, the comparison of an attribute value 80 (a distance 30) and an attribute value 10 (a distance 40) with a current value 50 allows the judgment that the attribute value 80 has a smaller distance. Besides the above-mentioned distance function, a distance function for setting a value smaller than a current value as being infinite or a self-defined distance function (e.g., a function derived from the statistical result) may also be used.

After the completion of Step S2407 or when it is judged "no" in Step S2405, the storage location judgment condition calculated in Step S2402 is reflected on the SPC management table 211 (S2408) to terminate the SPC management table update processing (S2409).

By the above processing, a storage location judgment condition 902 in accordance with the current value of the stream data 111 is set for each relation name 901 in the SPC management table 211.

FIGS. 16 to 18 are views, each showing an exemplary configuration of the SPC management table 211. FIG. 16 shows an SPC management table $211_1$ at the timestamp 10:00, FIG. 17 shows an SPC management table $211_2$ at the timestamp 10:10, and FIG. 18 shows an SPC management table $211_3$ at the timestamp 10:20.

In the relation name column 901 in FIGS. 16 to 18, a relation name corresponding to a data matching target, which is obtained from the registered query, is stored. The relation names stored in the SPC management table 211 may be all relation names. In the storage location judgment condition column 902, a condition for determining a storage location is stored. In a storage location column 903, the storage location is set. In an update frequency column 904 and an update policy column 905, an update frequency of the relation data and a policy when the relation data is updated are respectively stored. In an SPC index column 906, a column name of the SPC data, which is to be indexed, is stored. In an acquisition cost column 907, a cost for obtaining the relation data 226 as the SPC data on the stream processing system 102 is stored. The acquisition cost may be represented by a time until the acquisition of the relation data 226, a value corresponding to the time, or the like. Finally, in a timestamp column 908, an update timestamp is stored.

To the update frequency column 904, the update policy column 905, the SPC index column 906, and the acquisition cost column 907, the whole information is not required to be input. When the information is not input, a previously set value may be used instead. In the SPC information setting module 228, non-acquisition of the external data can be explicitly designated by the user 115 or the application 117 executed on the client computer 116.

For example, in the SPC management table $211_1$ of FIG. 16, a row $909_1$ indicates that, when the product ID in the relation data with the relation name "R1" is equal to or larger than 1000 and less than 1100 at 10:00, the SPC data is stored in the memory (SPC_OM 217) 216. Moreover, the update frequency of the relation data is low. The relation data 226 is obtained again to replace the SPC data upon the issue of the SPC clear instruction in the processing of relation data update. Further, the row $909_1$ also shows that the SPC data is not indexed and the SPC data acquisition cost is high.

A row $910_1$ shows that, when the product ID in the relation data with the relation name "R1" is equal to or larger than 1100 and less than 1200 at 10:00, the SPC data is stored in the disk (SPC_OD 219).

In the SPC management table $211_2$, a row $909_2$ shows that the condition of storing the SPC data in the memory (SPC_OM) is updated at 10:10 when the product ID is equal to or larger than 1090 and less than 1180. A row $910_2$ shows that the condition of storing the SPC data in the memory (SPC_OD) is updated at 10:10 when the product ID is equal to or larger than 1180 and less than 1270.

In the SPC management table $211_3$, a row $909_3$ shows that the condition of storing the SPC data in the memory (SPC_OM) is updated at 10:20 when the product ID is equal to or larger than 1500 and less than 1580. A row $910_3$ shows that the condition of storing the SPC data in the memory (SPC_OD 219) is updated at 10:20 when the product ID is equal to or larger than 1580 and less than 1660.

Figure 19:
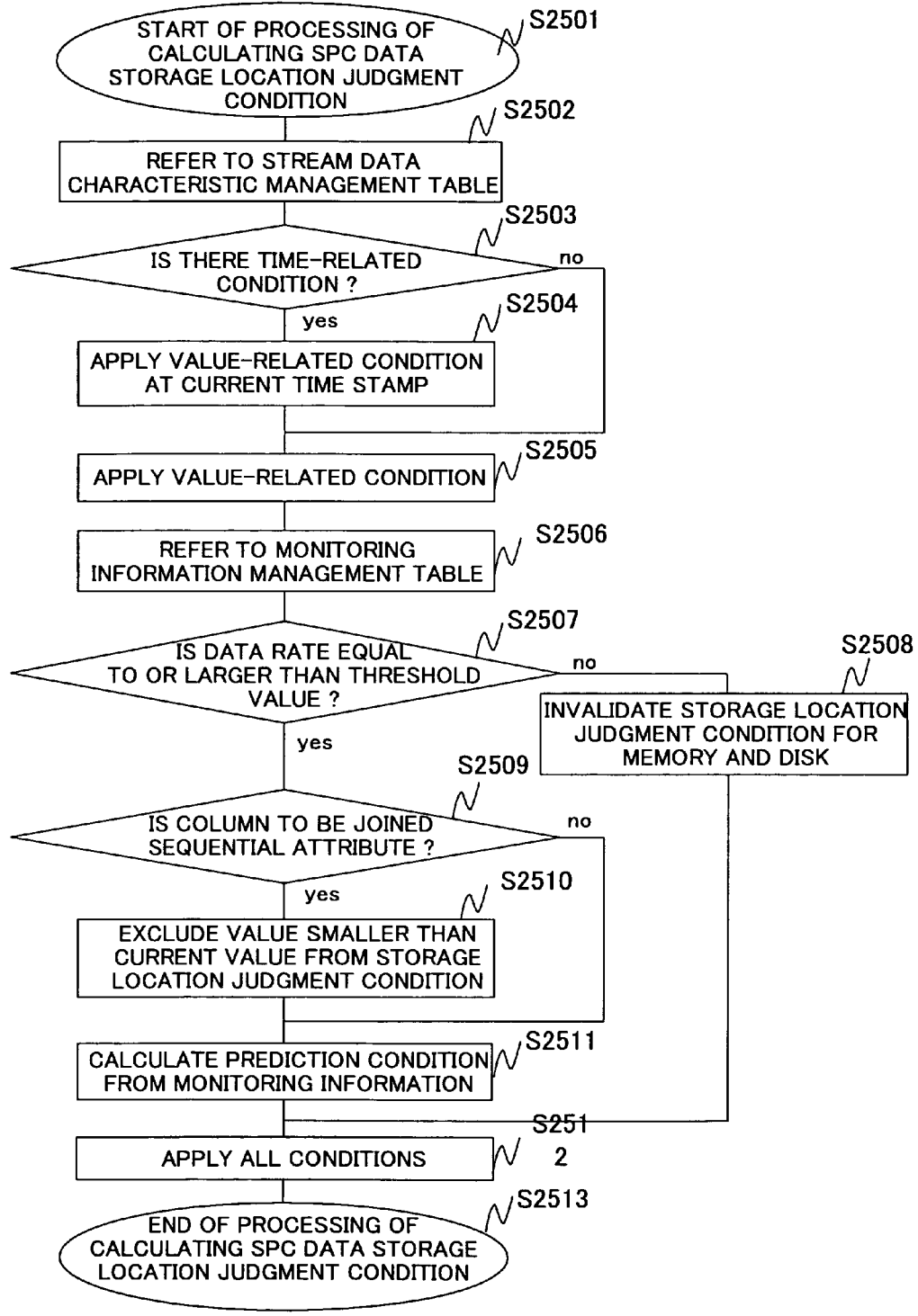
FIG. 19 is a flowchart showing a processing procedure of a processing of calculating an SPC storage location judgment condition.

Next, a procedure of the processing of calculating the SPC storage location judgment condition in Step S2402 is shown in a flowchart of FIG. 19, and will be described with reference to FIGS. 2, 11A to 11C, 12, 16, 17 and 18.

In the processing of calculating the SPC storage location judgment condition, the stream data characteristic management table 215 is first referred to (S2502). Then, it is judged whether or not the data is stored in the time-related condition column 703 shown in FIG. 12 (S2503). The processing is performed for each stream name in the stream data characteristic management table 215.

When it is judged "yes" in Step S2503, the condition in the value-related condition column 704 under the condition satisfied by the current timestamp is applied (S2504). After the completion of Step S2504 or when it is judged "no" in Step S2503, the condition in the value-related condition column 704 is applied (S2505). If the value-related condition 704 cannot be applied alone as in the case of a sequential attribute, the processing is not performed in this step.

Next, the reference is made to the monitoring information management table 208 to obtain the current monitoring information (S2506). Then, it is judged whether or not the data rate 803 in the obtained monitoring information is equal to or larger than the values in the data rate threshold value column 804 shown in FIGS. 11A to 11C (S2507). When it is judged "yes" in Step S2507, it is judged whether or not the value-related condition column 704 of the column to be joined is a sequential attribute (S2509).

The judgment in Step S2509 is made for the subsequent data matching. In the data matching, data matching using a certain attribute value as a key is referred to as a join processing. The column to be joined in Step S2509 denotes a column of a key of the stream data in a certain table, for which the join processing is performed. For example, in the registered query 1201 shown in FIG. 7, the data matching is performed for S1 and R1 by using the product ID of S1 and the product ID of R1 as keys. The column to be joined for R1 denotes an "S1's product ID" column. When the product ID column of S1 has a sequential attribute, the result of judgment in Step S2509 is "yes".

Next, when it is judged "yes" in Step S2509, a value smaller than the value in the current value column 805 is excluded from the storage location judgment condition (S2510).

The exclusion in Step S2501 means "narrowing the range of a conditional expression" for the storage location judgment condition. For example, in Step S2505, the range of the value-related condition is "30<=attribute value<100". When the current value in the value-related condition column 704 is 50 in Step S2510, the range of values smaller than the current value is excluded to set the range of the conditional expression "50<=attribute value<100".

After the completion of Step S2510 or when it is judged "no" in Step S2509, a prediction condition is calculated by using the values in the data rate column 803, the current value column 804, the statistical value column 805, the timestamp column 806, and the update frequency column 807 in the monitoring information management table 208 of FIG. 11A (S2511).

Besides the time-related condition (S2503) or the sequential attribute (S2509) input by the user, the prediction condition in Step S2511 means the narrowing of the range of the conditional expression based on the monitoring information obtained by monitoring the stream data. For example, in Step S2505, the range of the conditional expression is "30<=attribute value<100". When it is found that, based on the monitoring information obtained by monitoring, the stream data that the range is "40<=attribute value<60", the range is further narrowed under the above-mentioned condition in Step S2511. Besides the example shown above, when the condition is derived from the monitoring information, the processing for the prediction condition can be performed in Step S2512.

The prediction condition can be calculated under the prediction condition "equal to or larger than the current value and less than (current value+data rate×update frequency")", for example, when the sequential attribute is stored in the value-related condition column 704 in FIG. 12. The prediction condition calculating method is not limited to the above-mentioned one, and other prediction algorithms may be used.

When it is judged "no" in Step S2507, the storage location judgment condition in the memory and the disk is invalidated because the relation data is not obtained on the SPC 110 in the stream data processing system 102 (S2508).

Herein, the "invalidation" means "not cached". To be specific, the row containing the relation name "R4" shown in FIG. 16 corresponds to the case of invalidation. For example, in Step S2505, when the range is "30<=attribute value<100" and the data rate is equal to or smaller than the threshold value (a sufficient amount of data has not arrived yet), the corresponding range is not cached and the conditional expression is set as "- (no conditional expression)". In some cases, the entire range is cached.

After the completion of Step S2508 or after the completion of Step S2511, all the storage location judgment conditions, which are set until then, are applied (S2512) to terminate the processing of calculating the SPC storage location judgment condition (S2513).

By the above processing, the storage location judgment condition 902 is calculated in accordance with the current value of the stream data 111 for each relation name 901 in the SPC management table 211.

Figure 20:
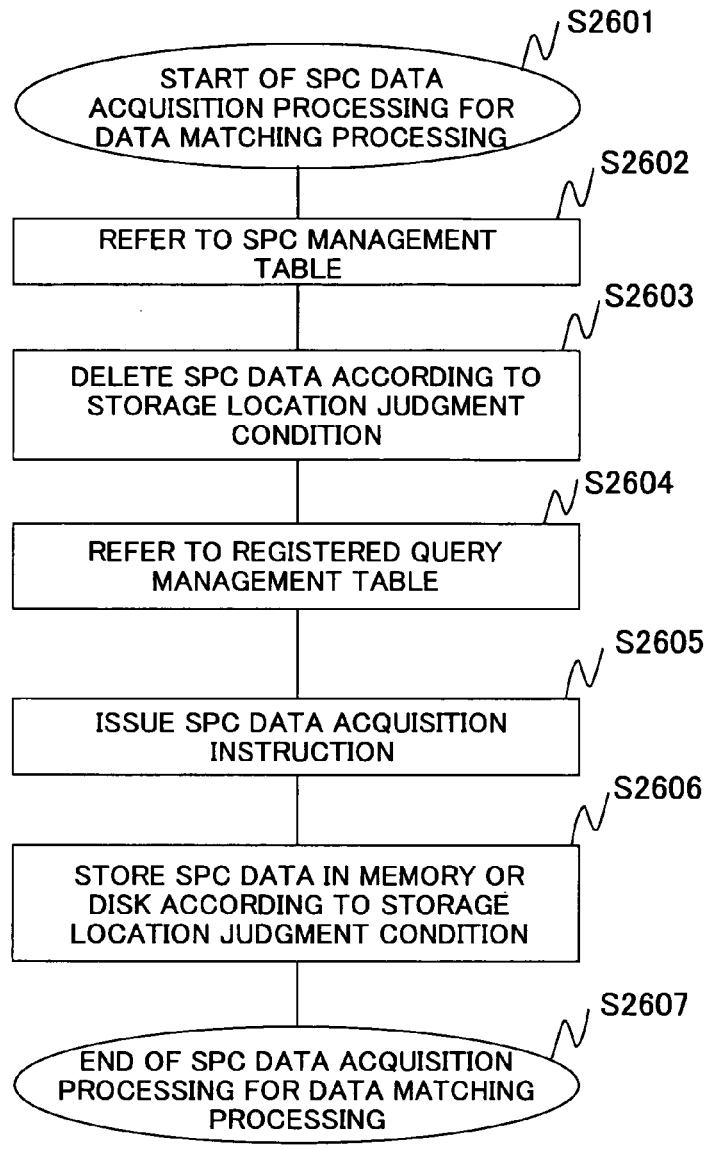
FIG. 20 is a flowchart showing a processing procedure of an SPC data acquisition processing at a time of a data matching processing.

Next, a procedure of the SPC data acquisition processing at a time of the data matching processing performed in Step S2100 shown in FIG. 9, in Step S2209 shown in FIG. 13, in Step S2304 shown in FIG. 14, and in Step S2716 shown in FIG. 23 is shown in a flowchart of FIG. 20, and will be described with reference to FIGS. 2 and 21.

In the SPC data acquisition processing at the time of the data matching processing, the SPC management table 211 is first referred to (S2602). When the storage location judgment condition 902 is updated in the processing in FIG. 19, the SPC data excluded from the storage location judgment condition 902 in the SPC_OM 217 and the SPC_OD 219 is deleted (S2603). Next, the registered query management table 205 is referred to (S2604), and the SPC data acquisition instruction is issued in the following manner (S2605).

The SPC data acquisition instruction creates an instruction for obtaining a row and a column related to the relation data in response to the query 602 stored in the registered query management table 205, and adds the condition (e.g., the storage location 903) stored in the SPC management table 211 to the instruction. The related row is created from the condition described in a processing of selecting the registered query 602, whereas the related column is created from the condition described in projection and join processings.

Finally, the SPC data obtained in response to the SPC acquisition instruction in Step S2605 is classified to be stored in any one of the memory (SPC_OM 217) and the disk (SPC_OD 219) based on the storage location judgment condition 902 described in the SPC management table 211 (S2606). Then, the SPC data acquisition processing at the time of the data matching processing is terminated (S2607).

By the above processing, the SPC acquisition instruction is issued based on the registered query 602 and the storage location judgment condition 902 to read the relation data 226 in the data management system 101 to the SPC_OM 217 or the SPC_OD 219.

FIGS. 21A to 21C shows examples of the SPC acquisition instruction. SPC acquisition instructions $1301_1$, $1301_2$, and $1301_3$ are SPC acquisition instructions at 10:00, 10:10, and 10:20, respectively.

For example, in the case of the registered query 1201 shown in FIG. 7, from FIGS. 4 to 6, the "line name" in SELECT phrase, "S1 [Rows 50]" in FROM phrase, and "S1. product ID=R1. product ID" in WHERE phrase are related to the product stream $111_1$. On the other hand, "order ID", "product ID", "product name", "orderer name" in SELECT phrase, "R1" and "R2" in FROM phase, and "R1. product ID=R2. product ID" and "R2. orderer='orderer A'" are not related to the product stream $111_1$ but to the product management table $226_1$ and the orderer table $226_2$. By the above processing, the instruction of obtaining the row and the column which are related to the relation data, "SELECT order ID, product ID, product name, orderer name, FROM R1, R2 WHERE R1. product ID=R2. product ID AND R2. orderer='orderer A';" can be created.

The addition of the storage location judgment condition "1000<=product ID<1200" for both the memory and the disk at 10:00, which is stored in the SPC management table $211_1$ shown in FIG. 16, creates the SPC acquisition instruction $1301_1$ at 10:00, "SELECT order ID, product ID, product name, orderer name, FROM R1, R2 WHERE R1. product ID=R2. product ID AND R2. orderer='orderer A'AND 1000<=product ID AND product ID<1200;".

The addition of the storage location judgment conditions 902 at 10:10 and 10:20 allows the creation of the SPC acquisition instruction $1301_2$ at 10:10 and the SPC acquisition instruction $1301_3$ at 10:20.

Although the SPC acquisition instruction is expressed in a SQL in this embodiment, the language used for the instruction is not limited thereto. Moreover, the result of the combination of two types of relation data is obtained as the SPC data in this embodiment, the relation data may be individually obtained in response to the SPC data acquisition instruction to perform the join processing of the relation data in the stream data processing system 102.

FIG. 22A, FIG. 22B and FIG. 22C shows SPC_OM data $217_1$, $217_2$, and $217_3$ and SPC_OD data $219_1$, $219_2$, and $219_3$ obtained in response to the SPC acquisition instructions $1301_1$, $1301_2$, and $1301_3$, respectively.

In FIGS. 22A to 22C, each of the SPC_OM data $217_1$, $217_2$, and $217_3$ and the SPC_OD data $219_1$, $219_2$, and $219_3$ allows data matching on the product management table $226_1$ shown in FIG. 5 and the order table $226_2$ shown in FIG. 6. In FIG. 22, an order ID column 1001 corresponds to an order ID column 501 in the order table $226_2$, an order ID column 1002 corresponds to the product ID column 401 in the product management table $226_1$ or the product ID column 502 in the order table $226_2$, a product name column 1003 corresponds to the product name column 402 in the product management table $226_1$, and an orderer name column 1004 corresponds to the orderer name column 503 in the order table $226_2$.

For example, a row 1005 allows data matching on the row 404 in the product management table $226_1$ and the row 504 in the order table $226_2$. Similarly, a row 1006 allows data matching on the row 405 and the row 505. In the same manner, the SPC_OM data $217_2$ and $217_3$, and the SPC_OD data $219_2$ and $219_3$ can be obtained.

Next, a procedure of the data matching processing executed in Step S2008 of FIG. 8 is shown in a flowchart of FIG. 23, and will be described below with reference to FIG. 2.

In the data matching processing, the stream data 111 is first obtained in the data matching module 112 (S2702). Next, the stream data characteristic management table 215 is referred to (S2703) to judge whether or not the restriction conditions stored in the stream data characteristic management table 215 (the conditions in the time-related condition column 703 and the value-related condition column 704 with the value in the restriction judgment flag column 706 shown in FIG. 12 being "Y") are satisfied (S2704). When it is judged "yes" in Step S2704, the stream data is discarded (S2717). Then, the log 222 indicating the discard of the stream data is output (S2718) to terminate the data matching processing (S2719).

FIG. 24 is a view showing an example of the log 222.

For example, a log 1401 indicates that a tuple "(10:21, 2500, line A)" is discarded at "10:21". The condition, under which the tuple is discarded, is "10:00<=time<=11:00, 1500<=product ID<=2000" registered by "Kashiyama".

The log 222 described above may be an event or a message to the user 115 or the application 117 executed on the client computer 116.

When it is judged "no" in Step S2704 of FIG. 23, the acquired stream data 111 does not violate the restriction condition. Therefore, the SPC management table 211 is referred to (S2705) to specify the storage location of the SPC data corresponding to a data matching target of the obtained stream data 111 (S2706). Next, the data matching of the obtained stream data and the SPC_OM 217 is performed (S2707). In this step, when the SPC data corresponding to a data matching target does not exist in the SPC_OM 217, the processing is not performed. Next, it is judged whether or not the SPC data corresponding to a data matching target contains the SPC data which does not exist on the SPC_OM 217 (S2708). When it is judged "no" in Step S2708, the data matching processing is terminated (S2719).

When it is judged "yes" in Step S2708, the data matching is performed on the obtained stream data 111 and the data in the SPC_OD 219 (S2709). In this step, when the SPC data corresponding to a data matching target does not exist in the SPC_OD 219, the processing is not performed. Next, it is judged whether or not the SPC data corresponding to a data matching target exists neither on the SPC_OM 217 nor on the SPC_OD 219 (S2710). When it is judged "no" in Step S2710, the result of data matching with the data on the SPC_OM 217 executed in Step S2707 or the result of data matching with the data on the SPC_OD 219 executed in Step S2709 is joined (S2714).

When it is judged "yes" in Step S2710, the SPC data, on which the data matching is performed, does not exist on the SPC 110 in the stream data processing system 102. Therefore, the relation data 226 existing on the data management system 101 is obtained. For this purpose, the SPC data acquisition instruction is issued (S2711). Then, the corresponding relation data 226 is read from the data management system 101 to the SPC_OM 217 or the SPC_OD 219 in the stream data processing system 102 to perform data matching on the obtained stream data 111 and the relation data 226 on the SPC (S2712). The result of data matching with the SPC data on the SPC_OM 217 executed in Step S2707, the result of data matching on the SPC data on the SPC_OD 219 executed in Step S2709, and the result of data matching on the relation data 226 executed in Step S2712 are joined (S2713). To be specific, the information of the corresponding SPC data on the SPC 110 is added to the received stream data 111 to generate the data matching result 113. The data matching result 113 is converted into the stream data 111, to which the significant information comprehensible to the user 115 is added. Then, the stream data processing system 102 transmits the data matching result 113 to the client computer 116.

After the completion of Step S2713 or Step S2714, in order to predict again the relation data corresponding to a data matching target, the SPC management table update processing is performed (S2715) as in Step S2109 of FIG. 9. Then, the SPC acquisition processing for the data matching processing is performed (S2716) to terminate the data matching processing (S2716).

By the above processing, the external data (the relation data 226) required for data matching can be read on the SPC 110 prior to the reception by the stream data 111 based on the characteristic information set in the stream data characteristic management module 109 and the monitoring information monitored by the stream data monitoring information management module 106, thereby enabling the data matching in real time. Moreover, the SPC 110 is configured in a hierarchical structure composed of the SPC_OM 217 on the memory 216 and the SPC_OD 219 on the disk 218, at least a part of the relation data 226 can be prestored in the SPC 110 in the stream data processing system 102.

FIG. 25 is a view showing an example of the data matching result 113.

The data matching result 113 is in the form of a table allowing data matching on the product stream $111_1$ shown in FIG. 4 and the SPC data (the SPC_OM data 217 or the SPC_OD data 219) shown in FIGS. 22A to 22C. A timestamp column 1101 corresponds to the timestamp column 304 in the product stream $111_1$, an order ID column 1102 corresponds to the order ID column 1001 in the SPC data, a product ID column 1103 corresponds to the product ID column 1002 in the SPC data, a line name column 1104 corresponds to the line name column 302 in the product stream $111_1$, a product name column 1105 corresponds to the product name column 1003 in the SPC data, and an orderer name column 1106 corresponds to the orderer name column 1004 in the SPC data.

For example, a row 1107 allows data matching on the row 305 in the product stream $111_1$ and the row 1005 in the SPC_OM data $217_1$.

One embodiment of the present invention has been described above.

The present invention is not limited to the above-mentioned embodiment, but various variations are possible within the scope of the present invention.

For example, although the client computer 116 and the data management system 101 are connected over the network in the above-mentioned embodiment, the client computer 116 and the data management system 101 may be provided on the same computer. Moreover, the storage system 109 has a two-level structure of the memory 216 and the disk 218 in the above embodiment but may also have a single-level structure of the memory 216 alone or a structure of three or more levels. Further, the storage system 109 is not limited to the memory or the disk but may also be other storage devices such as a tape or a flash memory.

Although the result of joining the two relation data is obtained as the SPC data in the above embodiment, the relation data may be individually obtained in response to the SPC data acquisition instructions to be then joined in the stream data processing system 102. In the above-mentioned case, in the registered query management table 205 shown in FIG. 10, the memory upper limit value in the memory upper limit value column 603 may be set for each relation corresponding to a data matching target.

FIG. 26 shows the registered query management table 205 in a case where the memory upper limit value in the memory upper limit value column 603 is set for each relation corresponding to a data matching target. Rows 610 and 611 correspond to the row 609 in the registered query management table 205 shown in FIG. 10. The row 610 indicates that the memory upper limit value is set to "7 MB" for an execution target relation column "R1", whereas the row 611 indicates that the memory upper limit value is set to "3 MB" for an execution target relation column "R2".

Although the storage location of the SPC data is judged by using both the stream data characteristic management table 215 and the monitoring information management table 208 in the above-mentioned embodiment, the storage location of the SPC data may be judged by using either one of the stream data characteristic management table 215 and the monitoring information management table 208.

Moreover, although the stream characteristic information set in the stream data characteristic management table 215 is input by the user 115 or the application 117 executed on the client computer 116 in the above-mentioned embodiment, the stream data characteristic information may be input for a schema definition of the stream data to automatically generate the stream data characteristic management table 215 from the schema definition.

Further, although the information set in the registered query management table 205, the monitoring information management table 208, the SPC management table 211, and the stream data characteristic management table 215 are set by the user 115 or the application 117 executed on the client computer 116 in the above embodiment, a processing mechanism for optimizing a query, which is disclosed in "Rate-based query optimization for streaming information sources" by Stratis Viglas, Jeffrey F. Naughton, In Proc. of SIGMOD conference 2002, pp. 37 to 48 (referred to as Non-Patent Document 3), may set the information, for example.

Further, the example where the SPC data is updated in response to the SPC clear instruction for updating the relation data has been described in the above-mentioned embodiment, the SPC data may be updated by monitoring a change in the data 114 (226) in the data management system 101 to detect the change in the data 114 and then transmitting the changed data 114 to the stream data processing system 102.

Figure 27:
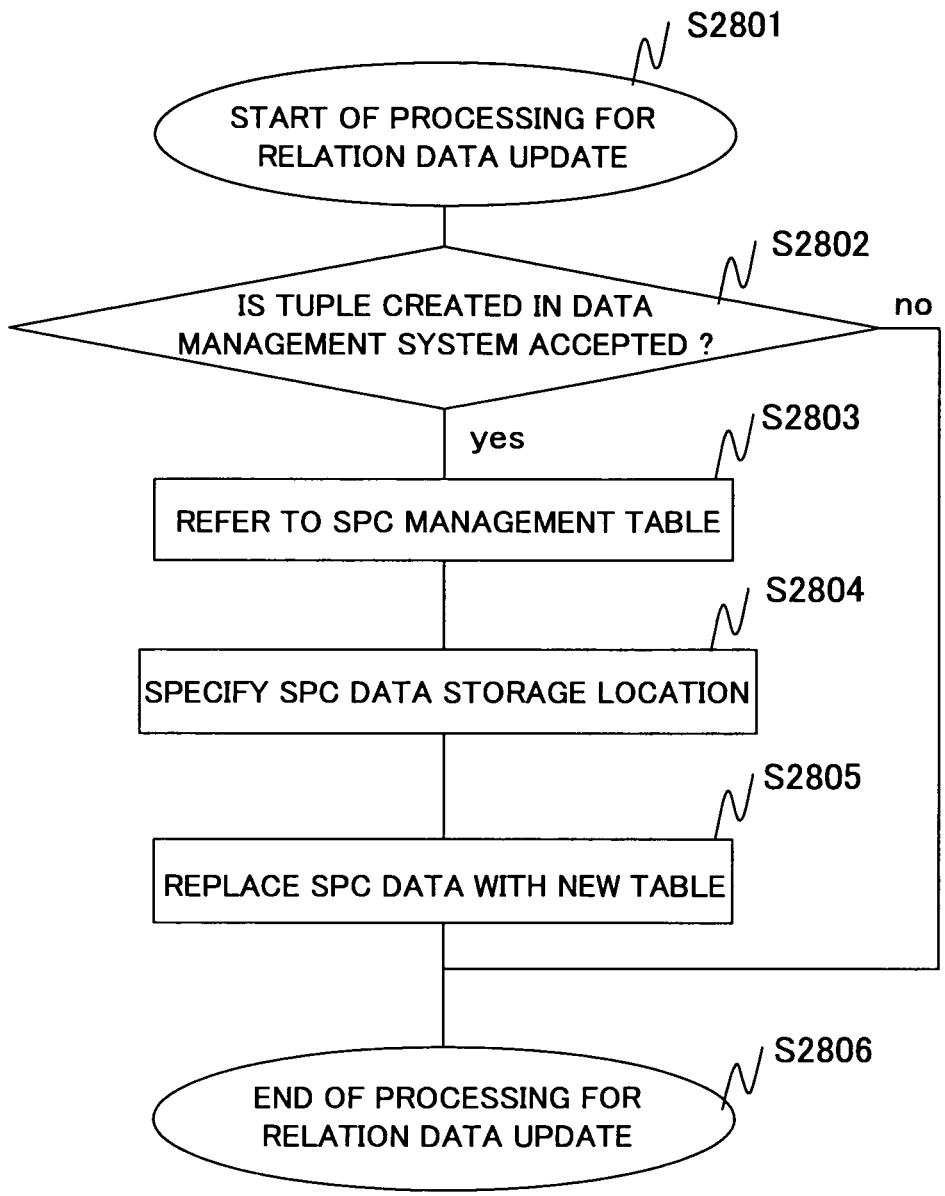
FIG. 27 is a flowchart showing another example of a processing procedure of a processing at a time of relation update when a change in data is detected and transmitted to the stream data processing system to update SPC data.

A processing of updating the SPC data by detecting a change in the relation data 226 in the data management system 101 and then transmitting the contents of the change to the stream data processing system 102 will be described. The processing corresponds to another example of the processing for relation update executed in Step S2006 of FIG. 8. A procedure of the processing is shown in a flowchart of FIG. 27 and will be described below with reference to FIG. 2.

In the processing for relation update, it is first judged whether or not the SPC management module 212 has accepted the tuple generated by the data management system 101 (S2802). When it is judged "yes" in Step S2802, the SPC management table 211 is referred to (S2803) to specify the storage location of the SPC data (S2804). The tuple present at the corresponding location is replaced by the changed tuple (S2805). After the completion of Step S2805 or when it is judged "no" in Step S2802, the processing for relation update is terminated (S2806).

The detection of a change in the relation data 226 in the data management system 101 can be realized by setting a trigger in a database or monitoring a data update instruction from the application in the data change detecting module 201. Then, the tuple creating module 202 creates a tuple, to which a time of change is assigned as a timestamp, and transmits the created tuple to the stream data processing system 102.

By using the time stamp assigned in the tuple creating module 202, the data matching execution module 220 can realize the data matching perfectly maintaining the coherence. The time of the data management system 101 and that of the stream data processing system 102 are synchronized.

Further, although the example where the stream data 111 in the record format has been described in the above embodiment, the stream data 111 may be present in any data format such as an XML document format or a CSV file format. Further, although the example where the data 114 in the storage system 104 of the data management system 101 is the relation data 226 has been described in the above embodiment, the data 114 may be present in any data format such as the XML document format or the CSV file format. If the data 114 is in a format other than the record format, the data format other than the record format is converted into the record format in the data conversion module 230 in the SPC management module 212 shown in FIG. 2 or in the data conversion module 230 in the data matching execution module 220 to enable the data matching of the stream data 111 and the data 114 in the storage system 104 in the data matching execution module 220.

Figure 28:
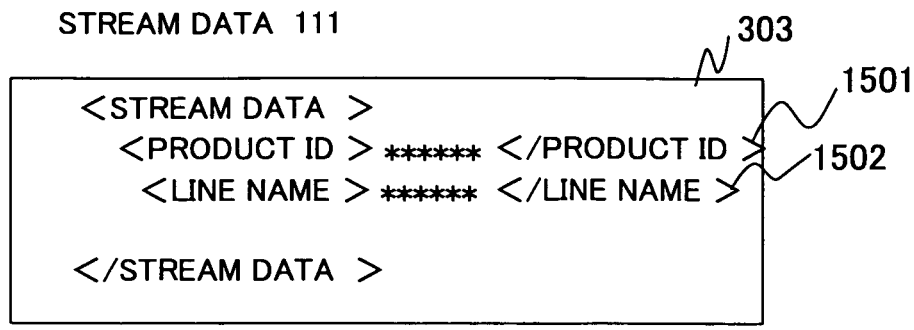
FIG. 28 is an explanatory view schematically showing a suitable data format when the stream data is in an XML document format.

FIG. 28 is a view schematically showing a suitable data format when the stream data 111 is in the XML document format.

Stream data 303 is expressed by an area sandwiched between "<stream data>" and "</stream data>". A row 1501 corresponds to the product ID column 301 shown in FIG. 3, whereas a row 1502 corresponds to the line name column 302 shown in FIG. 3. The above-mentioned relation is converted into the record format in the data conversion module 230 in the data matching execution module 220 to enable the data matching.

Figure 29:
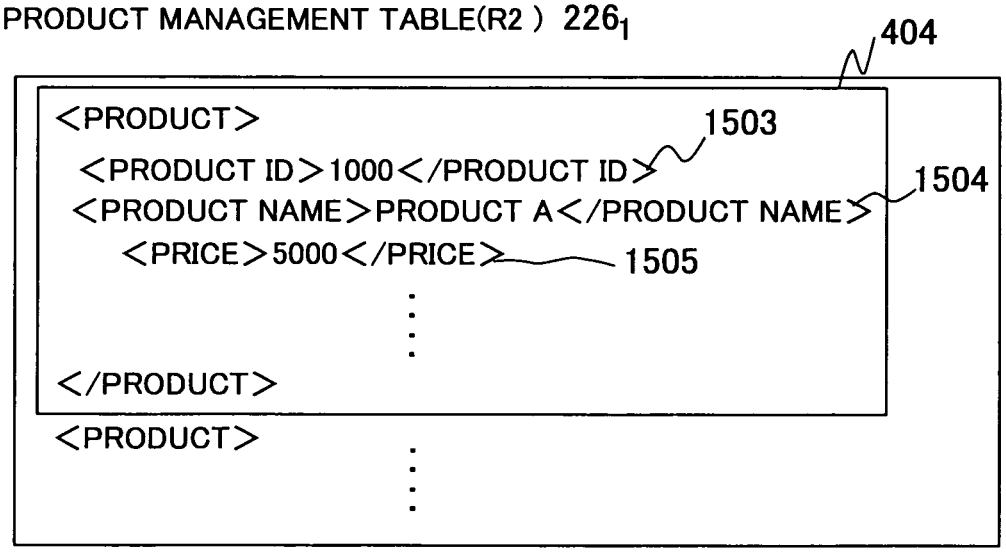
FIG. 29 is an explanatory view showing an example where data is in the XML document format.

FIG. 29 is a view showing an example where the data 114 is in the XML document format.

The row 404 shown in FIG. 5 is represented by an area sandwiched between "<product>" and "</product>". A row 1503 corresponds to the product ID column 401 shown in FIG. 5, a row 1504 corresponds to the product name column 402 shown in FIG. 5, and a row 1505 corresponds to the price column 403 shown in FIG. 5. The above-mentioned relation is converted into the record format in the data conversion module 230 in the SPC management module 212 or in the data conversion module 230 in the data matching execution module 220 to enable the data matching.

Further, although the stream data processing system 102 has been described as an arbitrary computer system in the above-mentioned embodiment, at least a part of the processings executed in the stream data processing system 102 may be executed in the storage system.

Further, although the example where the computer 12 outputs the product information, the environmental condition (for example, a temperature) or the like as the stream data 111 has been described in the above embodiment, the output of the stream data 111 is not limited thereto. For example, in place of the computer 12, a sensor network server for managing a large number of sensor nodes may output measurement values of the sensor nodes together with the stream data 111. Then, the stream data processing system 102 may convert the measurement values of the sensor nodes into the data matching result 113 containing significant information comprehensible to the user 115 to provide the data matching result 113 to the client computer 116.

A stream data processing system for obtaining stream data as primary information and converting the obtained primary information into secondary information based on preset information of external data includes: a stream data input module for obtaining the stream data as the primary information; a external data storage module for storing the external data for data matching with the stream data; a query management module for pre-registering a query describing a processing for the stream data; a storage location management module for referring to the query to read in advance at least a part of the external data in a stream predict cache preset in a storage system; and a data matching module for performing data matching on the external data read into the stream predict cache and the stream data to create the secondary information.

The stream data processing system further includes a stream data characteristic management module for storing characteristic information of the stream data indicating a characteristic of a value of the stream data; and a stream data monitoring module for monitoring the stream data to obtain monitoring information, in which the storage location management module determines the external data to be read in advance into the stream predict cache based on the characteristic information of the stream data and the obtained monitoring information.

In the stream data processing method according to a first aspect of this invention, the characteristic information of the stream data indicating the characteristic of the value of the stream data arriving after a processing time may be input to determine the external data to be obtained as the stream predict cache by using the characteristic information of the stream data.

In the stream data processing method according to the first aspect of this invention, monitoring information may be obtained by monitoring the stream data to determine the external data to be obtained as the stream predict cache by using the obtained monitoring information.

In the stream data processing method according to a sixth aspect of this invention, when the stream data has a plurality of the characteristic information items, at least a part of priority for judging which condition is to be used by priority, a restriction judgment flag column indicating a flag for determining time restriction information serving as a condition corresponding to time information in the stream data, for checking whether or not the stream data violates the condition, a fixed condition flag indicating a flag for judging whether the characteristic information is satisfied or is supposed to be satisfied without fail, and a registrant who has registered the characteristic data, may be stored in the stream data characteristic management table.

In the stream data processing method according to the sixth aspect of this invention, the stream data characteristic management table may be referred to and the condition in the value-related condition column in the stream data characteristic management table may be applied.

In the stream data processing method according to an eighth aspect of this invention, when the stream data violates the time restriction information, the stream data may be discarded, and the discarded stream data and the time restriction information may be output as a log.

In the stream data processing method according to a ninth aspect of this invention, at least a part of a data rate indicating an arrival rate of the stream data to be monitored, a data rate threshold value indicating a value for judging whether or not the stream predict cache is required based on the data rate, a current value indicating the latest value in the column name to be monitored at the time when the monitoring information is obtained, a statistical value indicating a statistical value after the previous acquisition of the monitoring information, and an update frequency column indicating an update interval of the monitoring information of the stream data, may be stored in the monitoring information management table.

In the stream data processing method according to a thirteenth aspect of this invention, at least a part of a query execution format storage destination indicating an address of a storage destination of an execution format of the pre-registered query, a registrant of the query obtained at the time of the query registration, a registration date/time of the query obtained at the time of the query registration, an execution target stream indicating a stream name corresponding to an execution target stream extracted from the query, and an execution target relation indicating a relation name corresponding to the query execution target extracted from the query, may be stored in the registered query management table.

In the steam data processing method according to a fifth aspect of this invention, at least a part of an update frequency of the external data, an update policy indicating a policy when the external data is updated, a stream predict cache index indicating a column name to be indexed for the stream predict cache data, and an acquisition cost indicating a cost for obtaining the external data as the stream predict cache data on the stream processing system, may be stored in the stream predict cache management table.

In the steam data processing method according to the fifth aspect of this invention, an external data management system may detect a change in the external data, create a tuple to which a time of the change is assigned, and transmit the created tuple to the stream data processing system.

In the steam data processing method according to the fifth aspect of this invention, a tuple created in an external data management system may be accepted, the stream predict cache management table may be referred to, and a storage location of the stream predict cache data may be specified to replace the stream predict cache data with the new tuple.

As described above, the present invention is applicable to a computer system for converting the stream data changing from moment to moment into the significant information based on the external data to provide the user with the obtained significant information. In particular, the present invention is applicable to a financial institution system, a sensor network system, or the like, in which the amount of stream data required to be processed in real time is enormous.

While the present invention has been described in detail and pictorially in the accompanying drawings, the present invention is not limited to such detail but covers various obvious modifications and equivalent arrangements, which fall within the purview of the appended claims.

What is claimed is:

1. A stream data processing method for creating secondary information from stream data input to a computer as primary information, and external data which is externally managed by a data management system to which the computer is coupled and previously stored in a storage system of the data management system, the method comprising the steps of:
   pre-registering, by the computer, a query which describes a processing of the stream data;
   storing, by the computer, stream data characteristic management information of stream data which relates a time-related condition with a value-related condition in a management table;
   analyzing, by the computer, the pre-registered query to determine which part of the external data corresponds to the pre-registered query and should be pre-fetched into a stream predict cache, where the stream data characteristic management information is referenced to determine at least part of the external data satisfying the time-related condition and satisfying the value-related condition of the management table;
   obtaining, by the computer, at least the part of the external data from the data management system and storing at least the part of the external data obtained from the data management system into the stream predict cache in the computer, in advance of obtaining the stream data;
   receiving, by the computer, the stream data, after storing at least the part of the external data into the stream predict cache;
   performing, by the computer, data matching on the part of the external data stored in the stream predict cache and at least a portion of the stream data to create the secondary information,
   accepting, by the computer, characteristic information of the stream data, the characteristic information being indicative of the time-related condition and the value-related condition of the stream data; and monitoring the stream data to obtain monitoring information,
wherein the step of analyzing uses the obtained monitoring information, in addition to the pre-registered query and the characterstic information of the stream data, to determine at least the part of the external data that should be pre-fetched into the stream predict cache.

2. The stream data processing method according to claim 1, wherein:
the step of storing at least the part of the external data into the stream predict cache includes the step of extracting a descriptive portion regarding at least the part of the external data from the pre-registered query for creating a stream predict cache data acquisition instruction for obtaining at least the part of the external data for the stream predict cache; and
the created stream predict cache data acquisition instruction is issued to obtain at least the part of the external data.

3. The stream data processing method according to claim 2, further comprising the step of retaining a relation name corresponding to a data matching target, which is obtained from the pre-registered query, a storage location judgment condition indicating a condition for determining a storage location of at least the part of the external data in the stream predict cache, the storage location of at least the part of the external data in the stream predict cache, and a timestamp indicating time information at which information regarding at least the part of the external data in the stream predict cache is updated, in stream predict cache management information.

4. The stream data processing method according to claim 3, wherein the step of creating the stream predict cache data acquisition instruction includes extracting a descriptive portion regarding at least the part of the external data, referring to the stream predict cache management information, and adding the storage location judgment condition.

5. The stream data processing method according to claim 4, further comprising the steps of:
retaining a stream name indicating a name of the stream data whose characteristic information is to be input, a column name indicating a name of the column to which the characteristic information is to be input, a time-related condition column indicating a condition regarding the timestamp, and a value-related condition column indicating a characteristic of a value corresponding to the column name, in the stream data characteristic management information.

6. The stream data processing method according to claim 5, wherein the step of creating the stream predict cache data acquisition instruction includes referring to the stream data characteristic management information to apply a condition in the value-related condition column in the stream data characteristic management table satisfying a condition in the time-related condition column in the stream data characteristic management table, from the time information in the timestamp column in the stream data characteristic management information.

7. The stream data processing method according to claim 5, wherein the step of creating the stream predict cache data acquisition instruction includes referring to the stream data characteristic management information retaining time restriction information serving as a condition corresponding to the time information in the stream data to judge whether or not the input stream data violates the time restriction information.

8. The stream data processing method according to claim 4, wherein the step of obtaining the monitoring information includes storing a stream name of the stream data to be monitored, a column name of the stream data to be monitored, and a timestamp indicating time information at which the monitoring information is obtained, in a monitoring information management information.

9. The stream data processing method according to claim 8, further comprising the step of referring to the monitoring information management module to calculate a prediction condition corresponding to a condition of obtaining at least the part of the external data being predicted as requiring the stream data based on the monitoring information.

10. The stream data processing method according to claim 9, wherein, when a data rate is smaller than a data rate threshold value as a result of reference to the monitoring information management module, at least the part of the external data is excluded from targets to be obtained.

11. The stream data processing method according to claim 4, further comprising the steps of:
retaining a stream name indicating a name of the stream data whose characteristic information is to be input, a column name indicating a name of the column to which the characteristic information is to be input, a time-related condition column indicating a condition regarding the timestamp, and a value-related condition column indicating a characteristic of a value corresponding to the column name, in stream data characteristic management information;
retaining a stream name of the stream data to be monitored, a column name of the stream data to be monitored, and a timestamp indicating time information at which the monitoring information is obtained, in a monitoring information management module; and
referring to the stream data characteristic management information and the monitoring information management module to judge whether or not the column has a sequential attribute, and deleting a value smaller than a value in a current value column in the monitoring information management module from the stream predict cache when the column has the sequential attribute.

12. The stream data processing method according to claim 4, further comprising the step of retaining the pre-registered query, a name of the pre-registered query, and a memory upper limit value indicating an upper limit of an amount of memory available to the pre-registered query, in registered query management information.

13. The stream data processing method according to claim 12, further comprising the step of referring to the stream predict cache management information to calculate a memory usage satisfying the storage location judgment condition in the stream predict cache stored in the memory and referring to the registered query management information to judge whether or not the memory usage in the stream predict cache is larger than the memory upper limit value in the registered query management information.

14. The stream data processing method according to claim 13, wherein it is judged whether or not the memory usage in the stream predict cache is larger than the memory upper limit value in a registered query management information, and, when it is judged that the memory usage is larger than the memory upper limit value, an amount of external data corresponding to the memory upper limit value is calculated to store the amount of external data corresponding to the memory upper limit value in an order of the external data with smaller distances of tuples.

15. The stream data processing method according to claim 14, wherein the stream predict cache management information is referred to, at least the part of the external data in the stream predict cache which is excluded from the condition in the storage location judgment condition column in the stream predict cache management information, is deleted, and at least the part of the external data in the stream predict cache, which is newly added to the condition in the storage location judgment condition column in the stream predict cache management information, is stored in any one of a memory and a disk of the computer.

16. The stream data processing method according to claim 15, wherein:
 the stream predict cache includes a stream predict cache on memory set on the memory of the computer and a stream predict cache on disk set on the disk of the computer; and
 the step of creating the secondary information comprises the steps of:
  referring to the stream predict cache management information to judge a storage location of the stream predict cache in which at least the part of the external data to be subjected to data matching is present, based on the storage location judgment condition;
  reading the corresponding external data from the stream predict cache on memory when the result of judgment is the stream predict cache on memory;
  reading the corresponding external data from the stream predict cache on disk when the result of judgment is the stream predict cache on disk;
  reading the corresponding external data when the result of judgment is neither the stream predict cache on memory nor the stream predict cache on disk; and
  performing data matching on the read external data and the stream data.

17. The stream data processing method according to claim 4, wherein a storage location management module is provided to accept a stream predict cache clear instruction to clear at least the part of the external data stored in the stream predict cache and to issue an instruction of obtaining the external data again.

18. The stream data processing method according to claim 1, wherein the stream data is generated continuously or intermittently over a period of time.

19. The stream data processing method according to claim 1, wherein at least the part of the external data is pre-fetched in advance of receiving the stream data so as to avoid having to issue another query to the database management system while the stream data is being processed in order to obtain significant information.

20. The stream data processing method according to claim 19, wherein the significant information is information such as a product name, a sensor location or a sensor type.

21. The stream data processing method according to claim 1, wherein the characteristic information of the stream data includes a two-dimensional condition corresponding to a combination of a time and a value range for an attribute value of the stream data.

* * * * *